(12) United States Patent
Johnson

(10) Patent No.: US 6,469,704 B1
(45) Date of Patent: Oct. 22, 2002

(54) SYSTEM AND METHOD FOR COMBINED EXECUTION OF GRAPHICS PRIMITIVE DATA SETS

(75) Inventor: Brett Edward Johnson, Windsor, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/232,966

(22) Filed: Jan. 19, 1999

(51) Int. Cl.[7] .............................................. G06T 15/00
(52) U.S. Cl. ..................... 345/553; 345/522; 345/419; 345/581
(58) Field of Search ................................. 345/418, 419, 345/581, 619, 621, 501, 503, 520, 522, 553

(56) References Cited

U.S. PATENT DOCUMENTS

| | | | | |
|---|---|---|---|---|
| 5,600,768 A | * | 2/1997 | Andresen ..................... | 395/135 |
| 5,793,386 A | * | 8/1998 | Larson et al. ................ | 345/522 |
| 5,856,829 A | * | 1/1999 | Gray, III et al. ............. | 345/422 |
| 5,883,642 A | * | 3/1999 | Thomas et al. .............. | 345/515 |
| 6,057,847 A | * | 5/2000 | Jenkins ........................ | 345/422 |
| 6,229,553 B1 | * | 5/2001 | Duluk, Jr. et al. ........... | 345/506 |
| 6,232,981 B1 | * | 5/2001 | Gossett ........................ | 345/430 |

* cited by examiner

Primary Examiner—Ulka J. Chauhan

(57) ABSTRACT

Graphics call sequence optimizer in a graphics system that includes a display list memory to store graphics calls to be executed. The optimizer optimizes an original graphics call sequence that includes a plurality of graphics primitive data-sets generated by a graphics application program in accordance with a graphics application program interface, generating an optimized graphics call sequence. The optimizer is configured to optimize the original graphics call sequence to produce the optimized graphics call sequence without storing the original graphics call sequence in the display list memory. The optimizer is configured to coalesce graphics primitive data sets within the original graphics call sequence to generate a corresponding single graphics primitive data set in the optimized graphics call sequence that causes a same rendering in the graphics system as the original graphics call sequence. The optimizer coalesces a series of graphics primitive data sets of a particular primitive type occurring sequentially within the original graphics call sequence into a single graphics primitive data set of the particular type in the optimized graphics call sequence.

19 Claims, 16 Drawing Sheets

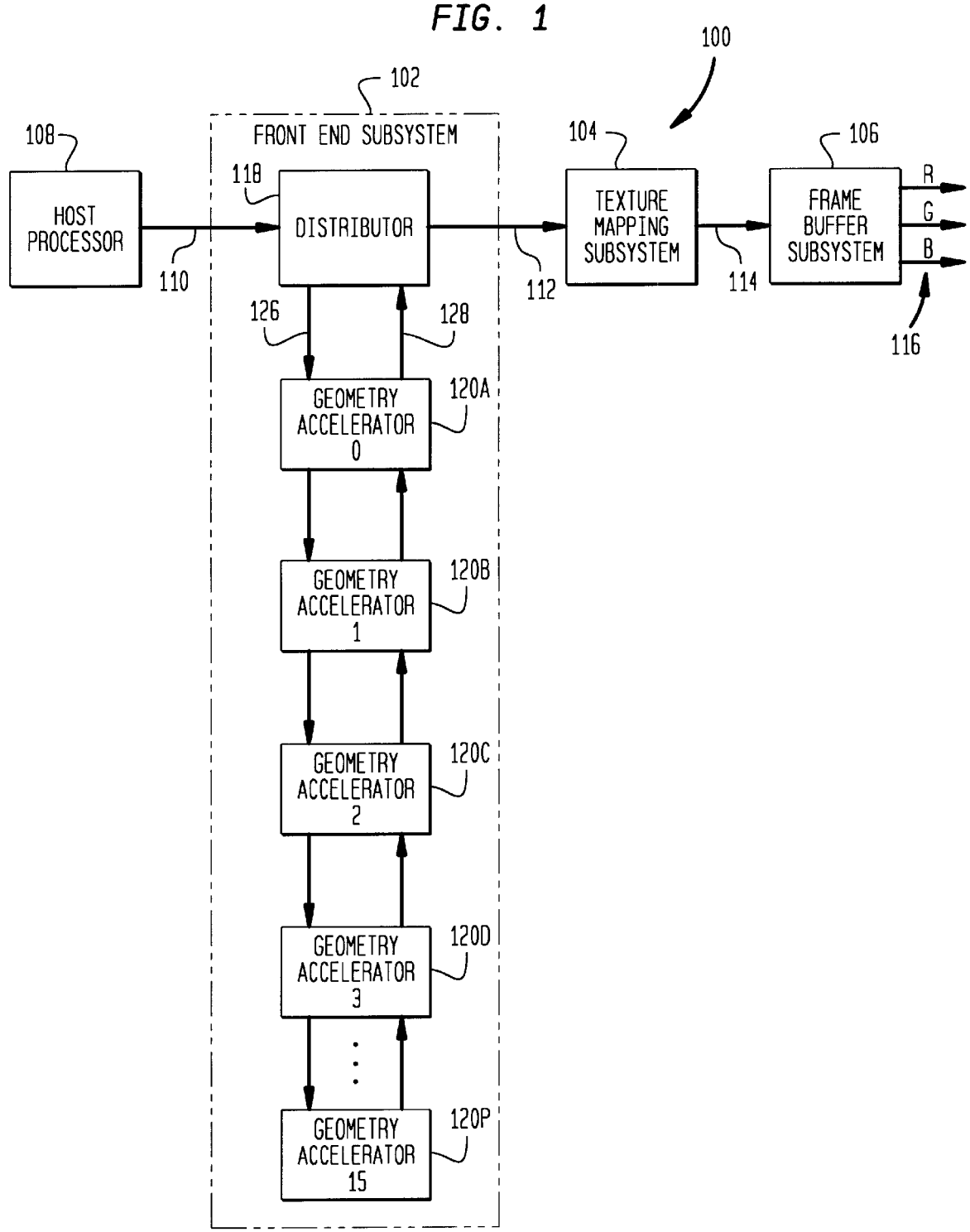

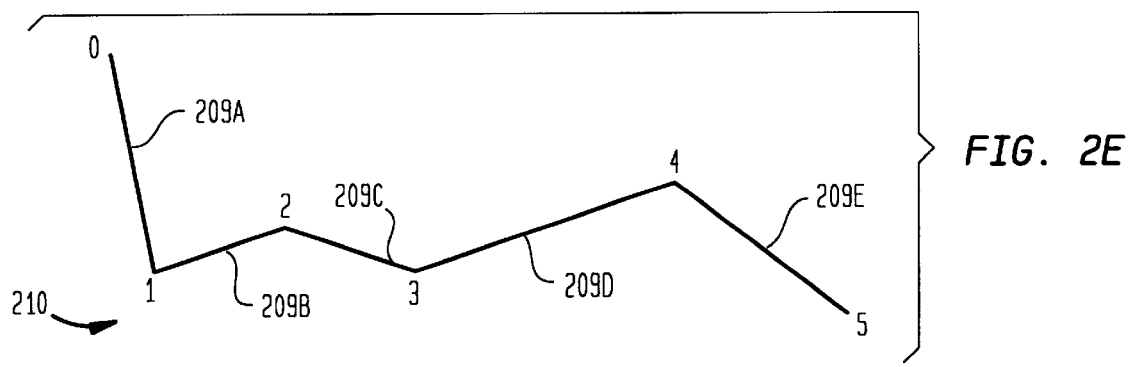
FIG. 2E
FIG. 2F
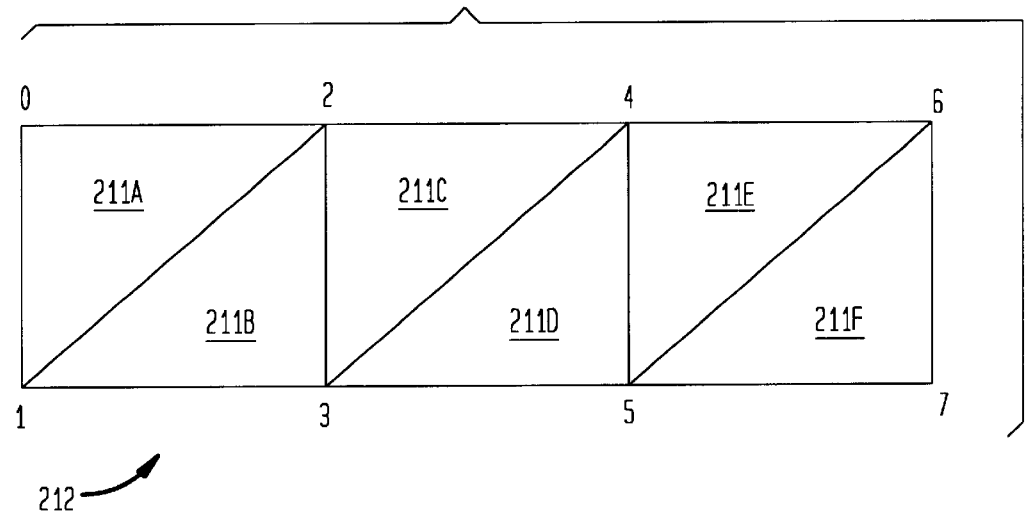
FIG. 2G
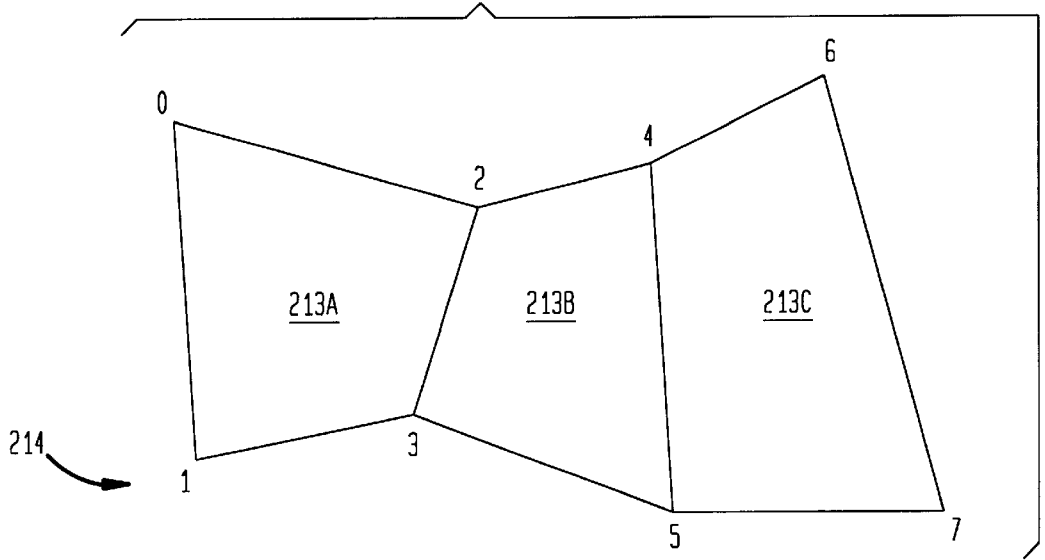

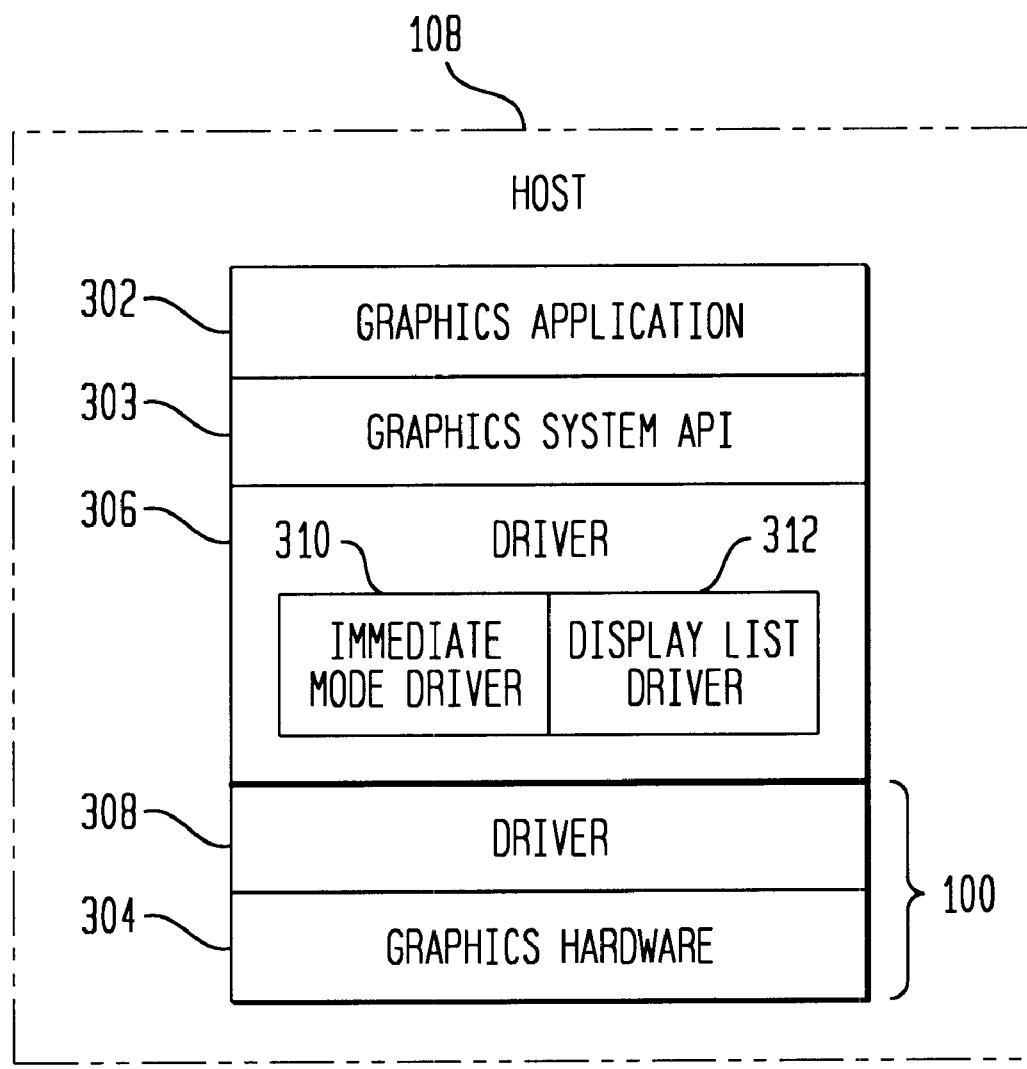

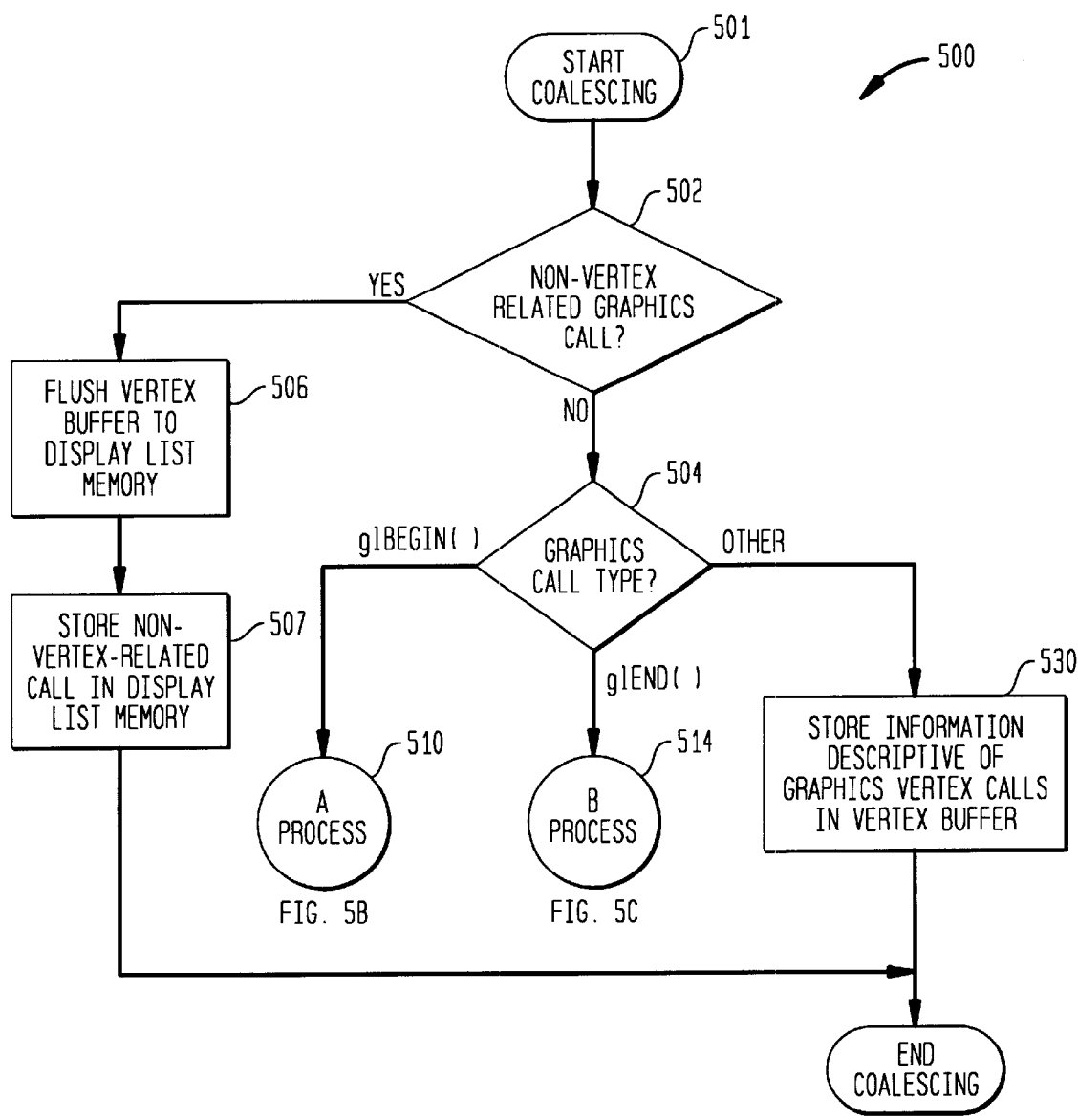

FIG. 6

| | ORIGINAL GRAPHICS CALL SEQUENCE | OPTIMIZED GRAPHICS CALL SEQUENCE | |
|---|---|---|---|
| 650 → | | | ← 654 |
| 660 { 652A, 652B, 652C, 652D, 652E | /*triangle 1*/<br>glBegin(GL_TRIANGLES)<br>glVertex( . . .)<br>glVertex( . . .)<br>glVertex( . . .)<br>glEnd() | glBegin(GL_TRIANGLES) ~656A<br>/*triangle 1*/<br>glVertex( . . .) ~656B<br>glVertex( . . .) ~656C<br>glVertex( . . .) ~656D<br>/*triangle 2*/ | } 658 |
| 662 { 652F, 652G, 652H, 652I, 652J | /*triangle 2*/<br>glBegin (GL_TRIANGLES)<br>glVertex( . . .)<br>glVertex( . . .)<br>glVertex( . . .)<br>glEnd() | glVertex( . . .) ~656E<br>glVertex( . . .) ~656F<br>glVertex( . . .) ~656G<br>glEnd() ~656H | } 680 |

FIG. 8

| ORIGINAL GRAPHICS PRIMITIVE SEQUENCE | OPTIMIZED PRIMITIVE COMMAND SET |
|---|---|
| /*TRIANLE STRIP*/<br>glBegin(GL_TRIANGLE_STRIP)<br>glVertex( )<br>glVertex( )<br>glVertex( )<br>glVertex( )<br>glVertex( )<br>glEnd()<br>/*LINE STRIP*/<br>glBegin (GL_LINE_STRIP)<br>glVertex( )<br>glVertex( )<br>glVertex( )<br>glEnd( ) | glPRIMITIVE SET COMMAND( )<br>glBegin(GL_TRIANGLES_STRIP)<br>glVertex( )<br>glVertex( )<br>glVertex( )<br>glVertex( )<br>glEnd( )<br><br>glBegin (GL_LINE_STRIP)<br>glVertex( )<br>glVertex( )<br>glVertex( )<br>glEnd( ) |

SYSTEM AND METHOD FOR COMBINED EXECUTION OF GRAPHICS PRIMITIVE DATA SETS

CROSS-REFERENCE TO RELATED APPLICATIONS

This application is related to the following commonly owned applications, some of which disclose subject matter related to the disclosure of the present application:

U.S. patent application Ser. No. 09/233,355 entitled "Real-Time Combination of Adjacent Identical Primitive Data Sets in a Graphics Call Sequence," filed concurrently herewith and naming as inventor Brett E. Johnson; and U.S. patent application Ser. No. 09/052,922, entitled "A System and Method for Assessing Performance Optimizations in a Graphics System," filed on Mar. 31, 1998, and naming as inventors John M. Brown et al.

BACKGROUND OF THE INVENTION

1. Field of the Invention

The present invention relates generally to graphics systems and, more particularly, to graphics system performance optimization techniques.

2. Related Art

Computer graphics systems are commonly used for displaying two- and three-dimensional graphical representations of objects on a two-dimensional video display screen. Current computer graphics systems provide highly detailed representations and are used in a variety of applications.

In a typical computer graphics system, an object or model to be represented on the display screen is broken down into graphics primitives. Primitives are basic components of a graphics display and include, for example, points, lines, triangles, quadrilaterals, triangle strips and polygons. Typically, a hardware/software scheme is implemented to render, or draw, the graphics primitives that represent a view of one or more models being represented on the display screen.

Generally, primitives of a three-dimensional object to be rendered are defined by a host computer in terms of primitive data. For example, when the primitive is a triangle, the host computer may define the primitive in terms of the X, Y, Z and W coordinates of its vertices, as well as the red, green and blue and alpha (R, G, B and α) color values of each vertex. Additional primitive data may be used in specific applications. Rendering hardware interprets the primitive data to compute the display screen pixels that represent each primitive, and the R, G and B color values for each pixel.

A graphics interface is typically provided to enable graphics applications located on the host computer to efficiently control the graphics system. The graphics interface provides specific commands that are used by a graphics application executing on the host computer to specify objects and operations, producing an interactive, three-dimensional graphics environment. Such a graphics interface is typically implemented with software drivers.

For example, the OpenGL® standard defines an application program interface (API) that provides specific commands that are used to specify objects and operations to produce interactive, three-dimensional applications. (OpenGL is a registered trademark of Silicon Graphics, Inc.). OpenGL is a streamlined, hardware-independent interface designed to be implemented on many different hardware platforms. As such, in computer systems which support OpenGL, the operating systems and graphics application software programs can make calls to the computer graphics system according to the standardized API without knowledge of the underlying hardware configuration. The OpenGL standard provides a complete library of low-level graphics manipulation commands for describing models of three-dimensional objects (the "GL" of OpenGL refers to "Graphics Library"). This standard was originally based on the proprietary standards of Silicon Graphics, Inc., but was later transformed into an open standard which is used in high-end graphics-intensive workstations and, more recently, in high-end personal computers. The OpenGL standard is described in the OPENGL PROGRAMMING GUIDE, version 1.1 (1997), the OPENGL REFERENCE MANUAL, version 1.1 (1997), and a book by Segal and Akeley (of SGI) entitled THE OPENGL GRAPHICS SYSTEM: A SPECIFICATION (Version 1.2), all of which are hereby incorporated by reference in their entirety.

A graphics system typically maintains state values that represent the current state of various aspects of object models. Graphics systems generally behave as a state machine; a specified state value remains in effect until it is changed by the graphics application through the issuance of an API command, also referred to herein as a graphics call, to the graphics system through the graphics software interface. Thus, all vertices are rendered in accordance with a current value of applicable state variables in the graphics system.

By providing detailed control over the manner in which primitives and their vertices are rendered in the graphics system, the graphics software interface provides software developers with considerable flexibility in creating graphics application software programs. A graphics software application may be structured in any one of many different configurations to implement a desired function or to achieve a desired result in the graphics system. For example, graphics applications may generate different graphics call sequences sequence to achieve the same rendering of the same model.

It is well known that some graphics call sequences and the manner in which primitives, vertices and states specified in the sequence are implemented are more efficient than others. That is, although multiple graphics applications may achieve the same rendering of the same model, certain graphics applications may, due to the contents of the graphics call sequence that they generate, cause the graphics system to perform unnecessary operations, or to perform certain operations in a manner that requires greater overhead than is otherwise necessary.

Generally, graphics call sequences generated by a graphics application are stored in a memory prior to being executed by the graphics system. When stored for execution by the graphics system, such graphics call sequences are commonly referred to as a display list. The memory dedicated to the temporary storage of these graphics call sequences is commonly referred to as a display list memory. In conventional graphics systems, overhead is associated with the storage of these graphics call sequences in the display list memory ("storage overhead"). For example, when generating a single graphics primitive using the OpenGL graphics library, a glBegin( ) graphics call is first issued to indicate the start of a particular type of the primitive. The glBegin( ) graphics call is followed by an appropriate number of glVertex( ) graphics calls specifying the vertices of the identified primitive, followed by a glEnd( ) graphics call to indicate the end of the primitive. A number of different graphics calls may be located between a glBegin( )/glEnd( ) graphics call pair. Such graphics calls include graphics vertex calls as well as graphics calls that set state variables. All such graphics calls are referred to herein as vertex-related graphics calls. The glBegin( )/glEnd( ) pair and all vertex-related graphics calls interposed between the two are collectively and generally referred to herein as a primitive data set. Other graphics calls that do not occur between a glBegin( ) and glEnd( ) graphics call are referred to herein as non-vertex-related graphics calls. One particular type of non-vertex-related graphics call is a type of graphics call that alters the modal state of the graphics system. A primitive data set representing, for example, a single independent triangle, includes a glBegin( ) call, followed by three glVertex( ) calls to generate the three vertices of the triangle primitive, followed by a glEnd( ) call. As a result, five graphics calls or commands are processed to generate a single triangle primitive. All five of these commands in the primitive data set are stored in the display list memory. A display list generated by a typical graphics application often contains millions of graphics primitive data sets. The overhead associated with the storage of a large number of primitive data sets in the display list memory can impose a significant burden on the efficiency of the graphics system.

Furthermore, when a primitive data set is executed, execution of the glBegin( ) command at the beginning of each primitive data set typically incurs some execution overhead by the graphics system, such as verifying the validity of the identified primitive, and configuring the graphics hardware to render the specified primitive. Thus, the total execution overhead associated with executing the glBegin( ) commands in a typical graphics call sequence can be significant.

Some graphics system optimization schemes perform post-processing of the display list subsequent to its generation by an application program. Such post-processing techniques generally require that primitive data for all graphics calls which are to be optimized have been generated and stored in the display list memory prior to the performance of the optimization techniques. Once the graphics call sequence is stored in the display list memory, such conventional post-processing techniques analyze the stored display list to determine if it can be optimized. Generally, such conventional post-processing techniques adversely affect the performance of the graphics system. The impact of such processing on run-time operations is so great that such techniques are sometimes performed off-line to analyze the performance of, and identify potential improvements to, the graphics application. Furthermore, removal from the display list of unnecessary graphics calls causes memory fragmentation of the display list memory, adversely impacting the performance of the graphics system.

What is needed, therefore, is a system and method that optimizes graphics call sequences by reducing the storage and/or execution overhead associated with the generation, storage and execution of such sequences.

SUMMARY OF THE INVENTION

The present invention is directed to apparatuses and methodologies for use in a graphics system that includes a display list memory to store graphics calls to be executed. In one aspect of the invention, a graphics call sequence optimizer is disclosed. The optimizer optimizes an original graphics call sequence that includes a sequence of graphics calls generated by a graphics application program in accordance with a graphics application program interface (API). The optimizer generates an optimized graphics call sequence that effects a same rendering in the graphics system as the original graphics call sequence. The optimizer includes a primitive command set generator constructed and arranged to receive the original graphics call sequence and to generate a primitive command set for storage in the display list memory. The primitive command set includes a plurality of primitive data sets each comprised of graphics calls of the original graphics call sequence. In one embodiment, the optimizer also includes a display list executor constructed and arranged to retrieve the primitive command set from the display list memory and to execute the primitive command set without performing duplicative operations associated with each primitive data set included in the primitive command set. The primitive command set generator notifies the display list executor that the graphics call sequence stored in the display list memory is a primitive command set. The generator may insert a graphics call in the display list memory adjacent to the primitive data sets to notify the display list executor that the primitive data sets comprise a primitive command set, or communicate such information using other mechanisms or techniques. The plurality of graphics primitive data sets may occur sequentially in the original graphics call sequence and the optimized graphics call sequence may include graphics primitive data sets of differing primitive types.

In one particular embodiment, the API is the OpenGL API. In this embodiment, each of the graphics primitive data sets in the optimized graphics call sequence comprises a glBegin( ) graphics call, a glEnd( ) graphics call and intermediate vertex-related graphics calls. The display list executor is constructed and arranged to generate hardware signals for each glBegin( ) and glEnd( ) graphics call except a first occurring glBegin( ) graphics call and a last occurring glEnd( ) graphics call in the primitive command set.

In another aspect of the invention, a method for optimizing an original graphics call sequence is disclosed. The original graphics call sequence is generated by a graphics application program in accordance with a graphics application program interface (API) for use in a graphics system that includes a display list memory to store graphics calls to be executed. The original graphics call sequence includes a plurality of graphics primitive data sets. The method comprises the steps of: a) combining a plurality of primitive data sets occurring sequentially in the original graphics call sequence into a primitive command set that includes the plurality of combined primitive data sets and a primitive set command identifying the plurality of primitive data sets as comprising the primitive command set; and b) storing the primitive command set in the display list memory, wherein the primitive command set is included in an optimized graphics call sequence that effects a same rendering in the graphics system as the original graphics call sequence. The optimized graphics call sequence may include graphics primitive command sets of differing primitive types. In one embodiment, the method also includes the steps of: c) identifying the primitive command set in the display list memory; and d) executing the primitive command set in the optimized graphics call sequence stored in the display list memory.

In one embodiment of this aspect of the invention, the API is the OpenGL API. In this embodiment, each of the graphics primitive data sets in the optimized graphics call sequence comprises a glBegin( ) graphics call, a glEnd( ) graphics call and intermediate vertex-related graphics calls. Step d) includes the steps of: 1) outputting a glBegin( ) graphics call; 2) for each primitive data set in the optimized graphics primitive call sequence, performing steps of: (a) outputting internal graphics vertex call sequence of the primitive data set, (b) outputting a signal indicating the end of a primitive data set, and (c) outputting a signal indicating the beginning of a primitive data set; and 3) outputting a glEnd( ) graphics call. Alternatively, step d) includes the step of: 1) generating hardware signals for each glBegin( ) and glEnd( ) graphics call except a first occurring glBegin( ) graphics call and a last occurring glEnd( ) graphics call in the primitive command set.

In a still further aspect of the invention, a computer readable medium encoded with a program for execution on a host computer, the program, when executed on the host computer, performs a method for optimizing an original graphics call sequence including a sequence of graphics calls generated by a graphics application program in accordance with a graphics application program interface (API) to generate an optimized graphics call sequence. The original graphics call sequence including a graphics primitive command set, the method comprising the steps of: a) combining a plurality of primitive data sets occurring sequentially in the original graphics call sequence into a primitive command set that includes the plurality of combined primitive data sets and a primitive set command identifying the plurality of primitive data sets as comprising the primitive command set; and b) storing the primitive command set in the display list memory, wherein the primitive command set is included in an optimized graphics call sequence that effects a same rendering in the graphics system as the original graphics call sequence. Preferably, the method further include the steps of: c) identifying the primitive command set in the display list memory; and d) executing the primitive command set in the optimized graphics call sequence stored in the display list memory.

Various embodiments of the present invention provide certain advantages and overcome certain drawbacks of the conventional techniques. Not all embodiments of the invention share the same advantages and those that do may not share them under all circumstances. This being said, the present invention provides numerous advantages including efficiently executing primitive data sets. Specifically, embodiments of the present invention stores a primitive command set in a display list memory which is subsequently executed by a display list executor. The primitive command set may be stored in a contiguous block of memory. When executed, the display list executor identifies the primitive data sets as belonging to a primitive command set and eliminates processes common to the primitive data sets where possible. This substantially eliminates the time to execute the primitive data sets.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

The foregoing and other features and advantages will be understood more clearly from the following detailed description and from the accompanying figures. This description is given by way of example only and in no way restricts the scope of the invention. In the figures:

FIG. 1 is a block diagram of an exemplary computer graphics system in which the present invention may be implemented.

FIG. 2E is a diagram of a line strip primitive which may be rendered on a computer display screen.

FIG. 2F is a diagram of a triangle strip primitive which may be rendered on a computer display screen.

FIG. 2G is a diagram of a quadrilateral strip primitive which may be rendered on a computer display screen.

FIG. 3 is a block diagram illustrating an embodiment of the performance optimization system of the present invention implemented as a display list driver in a graphics system software driver.

FIGS. 5A–5C together form a flow diagram of procedures performed by one embodiment of the performance optimization system of the present invention to coalesce adjacent primitive data sets into a single coalesced primitive data set.

FIG. 6 is a table illustrating an exemplary coalescing of an original graphics call sequence having a plurality of primitive data sets to an optimized graphics call sequence having a coalesced primitive data set.

FIG. 8 is a table illustrating an exemplary original graphics call sequence that includes two primitive data sets and a primitive command set of the invention that includes the same two primitive data sets.

DETAILED DESCRIPTION

Figure 2A:
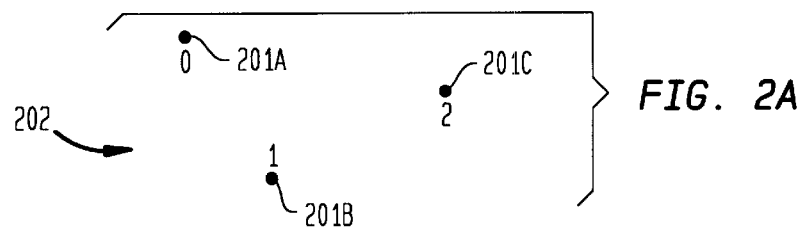
FIG. 2A is a diagram of a series of independent point primitives which may be rendered on a computer display screen.

Illustrative aspects of the present invention are directed to apparatuses and methodologies for use in a graphics system that includes a display list memory to store graphics calls to be executed by the graphics system. Certain disclosed aspects of the present invention optimize an original graphics call sequence that includes a plurality of graphics primitive data sets generated by a graphics application program in accordance with a graphics application program interface (API). Each of the plurality of graphics primitive data sets includes one or more graphics vertex calls that together define at least one primitive of a same primitive type. The present invention generates an optimized graphics call sequence that includes a single coalesced primitive data set that causes a same rendering in the graphics system as the plurality of graphics primitive data sets in the original graphics call sequence. That is, the coalesced primitive data set includes one or more vertex calls defining the at least one primitive of the same primitive type. Significantly, the present invention may optimize the original graphics call sequence as it is generated by the graphics application program (that is, during run-time) prior to and without storing the original graphics call sequence in the display list memory. As such, the optimized graphics call sequence is quickly and efficiently generated and stored in the display list memory for execution by the graphics system.

FIG. 1 is a block diagram of an exemplary computer graphics system 100 suitable for implementing embodiments of the performance optimization system and methodology of the present invention. As shown, graphics system 100 includes a front-end subsystem 102, a texture mapping subsystem 104 and a frame buffer subsystem 106. Front-end subsystem 102 receives primitives to be rendered from a graphics application program executing on the host computer 108 over bus 110. The primitives are typically specified by X, Y, Z and W coordinate data and R, G, B and α color data and texture S, T, R and Q coordinates for portions of the primitives, such as vertices.

Data representing the primitives in three dimensions are provided by front-end subsystem 102 to frame buffer subsystem 106 over bus 112 to the optional texture mapping subsystem 104. Texture mapping subsystem 104 interpolates the received primitive data to provide values from stored texture maps to frame buffer subsystem 106 over one or more buses 114.

Frame buffer subsystem 106 interpolates the primitive data received from front-end subsystem 102 to compute the pixels on the display screen that will represent each primitive, and to determine object color values and Z values for each pixel. Frame buffer subsystem 106 combines, on a pixel-by-pixel basis, the object color values with the resulting texture data provided from optional texture mapping subsystem 104, to generate resulting image R, G and B values for each pixel. R, G and B color control signals for each pixel are respectively provided over R, G and B lines 116 to control the pixels of the display screen (not shown) to display a resulting image on the display screen that represents the texture-mapped primitive.

Front-end subsystem 102 includes a distributor 118 and a plurality of three-dimensional geometry accelerators 120A–120P (collectively and generally referred to as geometry accelerators 120). Distributor 118 receives the coordinate and other primitive data over bus 110 from a graphics application on host computer 108. In this illustrative graphics system environment, distributor 118 dynamically allocates the primitive data among geometry accelerators 120.

Primitive data, including vertex state (coordinate) and property state (color, lighting, etc.) data, is provided over bus 126 to geometry accelerators 120. Each geometry accelerator 120 performs well-known geometry accelerator functions which results in rendering data for frame buffer subsystem 106. Rendering data generated by geometry accelerators 120 is provided over output bus 128 to distributor 118. Distributor 118 reformats the primitive output data (that is, rendering data) received from the geometry accelerators 120, performs a floating point to fixed point conversion, and provides the primitive data stream over bus 112 to the optional texture-mapping subsystem 104 and subsequently to frame buffer subsystem 106.

Texture mapping subsystem 104 and frame buffer subsystem 106 may be any well-known systems now or later developed. Furthermore, front-end subsystem 102, texture mapping subsystem 104 and frame buffer subsystem 106 are preferably pipelined and operate on multiple primitives simultaneously. While texture mapping subsystem 104 and frame buffer subsystem 106 operate on primitives previously provided by front-end subsystem 102, front-end subsystem 102 continues to operate and provide new primitives until pipelines in subsystems 104 and 106 become full.

FIG. 3 is a block diagram illustrating an embodiment of the graphics system performance optimization system of the present invention implemented as a display list driver 312 in a graphics system environment. As shown in FIG. 3, a graphics application 302 executed on host computer 108 issues graphics calls in accordance with a graphics system application program interface (API) 303. Graphics calls issued by graphics application 302 are forwarded by graphics system API 303 to a driver 306 residing on host computer 108. In one embodiment of the present invention in which graphics system API 303 is implemented according to the OpenGL standard, graphics application 302 can select one of two available modes in which to issue graphics calls at any given time. Graphics calls issued by graphics application 302 for immediate execution by graphics system 100 ("immediate mode") are executed by an immediate mode driver 310. Immediate mode driver 310 is well-known in the art and will therefore not be described further herein. Graphics calls issued by graphics application 302 that are to be stored in a display list memory prior to execution by graphics hardware 304 are processed by a display list driver 312. Display list driver 312 will be described in greater detail below.

In the illustrative implementation illustrated in FIG. 3, the optimization system of the present invention is implemented in driver 306. In particular, and as will be explained in more detail below, in one embodiment of the disclosed aspects of the present invention, display list driver 312 optimizes graphics call sequences as they are generated by graphics application 302; that is, in real-time. As described in more detail below, display list driver 312 optimizes a graphics call sequence generated by graphics application 302 to generate and store an optimized graphics call sequence that is stored in a display list memory as a display list to be executed by graphics hardware 304. Driver 306 forwards graphics calls to a hardware driver 308 in graphics system 100 that converts graphics calls as required to communicate with graphics hardware 304 and/or that passes the calls through to graphics hardware 304. Aspects of front-end subsystem 102, texture mapping subsystem 104, and frame buffer subsystem 106 (FIG. 1) may be implemented in graphics hardware 304. Display list driver 312 forwards to hardware driver 308 an optimized graphics call sequence to be executed.

In one embodiment, the OpenGL® standard is used to implement application program interface (API) 303. In OpenGL, all models to be rendered are ultimately formed of primitives and are described as an ordered set of vertices. The graphics vertex call, glVertex( ), is provided to specify a single vertex for use in specifying a primitive. Up to four coordinates (x, y, z, w) may be supplied for a particular vertex or as few as two (x, y) by selecting the appropriate version of graphics vertex call.

To create a primitive, such as a point, line, or polygon, graphics vertex calls specifying the set of vertices must be issued after a glBegin( ) graphics call and must be followed by a glEnd( ) graphics call, commonly referred to as a glBegin( )/glEnd( ) pair. The glBegin( ) graphics call takes a single argument or "mode" specifying the type of primitive to be constructed from the vertices in the primitive data set. Referring to FIGS. 2A–2J, the currently-available primitive types (modes) supported by the exemplary API, OpenGL, are described below.

The command glBegin(GL_POINTS) specifies individual points to be displayed. Specifically, the command causes graphics system 100 to draw a point at each of the n vertices within the glBegin( )/glEnd( ) pair. Referring to FIG. 2A, there are three points 201A, 201 B and 201C, each of which is drawn at one of the vertices $v_0$, $v_1$ and $v_2$, respectively.

Figure 2B:
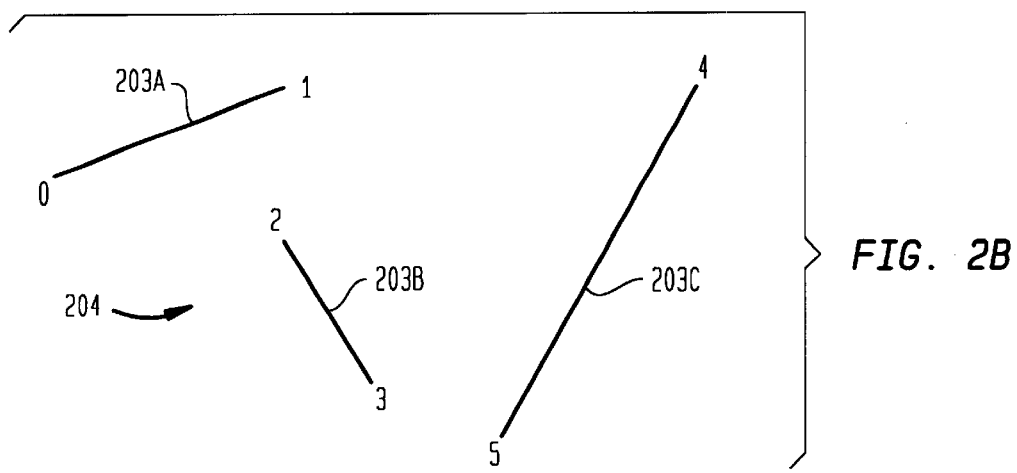
FIG. 2B is a diagram of a series of independent line primitives which may be rendered on a computer display screen.

The command glBegin(GL_LINES) specifies pairs of vertices interpreted as the end point of individual line segments. Specifically, the command causes graphics system 100 to draw a series of unconnected line segments. Line segments are drawn between $v_0$ and $v_1$, between $v_2$ and $V_3$, and so on. If n is odd, the last segment is drawn between $v_{n-3}$ and $v_{n-2}$ and $v_{n-1}$ is ignored. Referring to FIG. 2B, lines 204 include a line 203A drawn between vertices $v_0$ and $v_1$, line 203B drawn between vertices $v_2$ and $V_3$, and line 203C drawn between vertices $V_4$ and $v_5$. As shown, the lines 203A, 202B and 203C are independent primitives; that is, they do not have a common vertex; they are unconnected line segments.

Figure 2C:
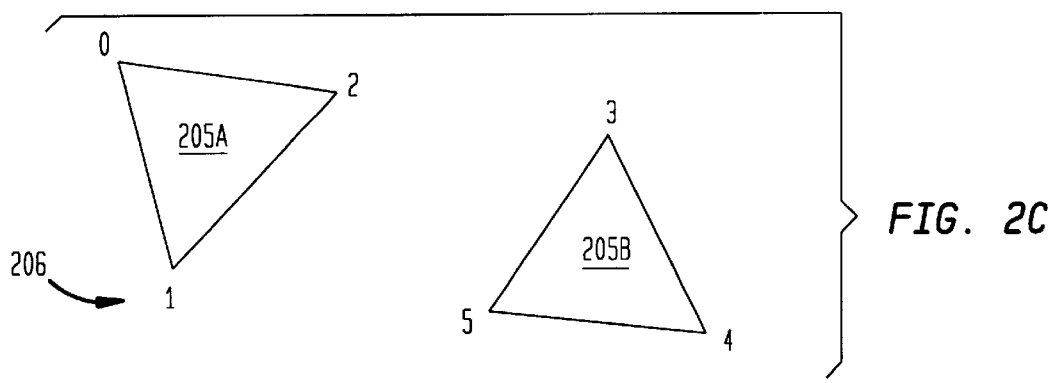
FIG. 2C is a diagram of a series of independent triangle primitives which may be rendered on a computer display screen.

The command glBegin(GL_TRIANGLES) specifies triples of vertices interpreted as the end points of a triangle. Specifically, the command causes graphics system 100 to draw a series of triangles (three-sided polygons) using vertices $v_0$, $v_1$, $V_2$, then $V_3$, $V_4$, $V_5$, and so on. If n is not an exact multiple of 3, the final one or two vertices are ignored. Referring to FIG. 2C, triangles 206 include a triangle 205A defined by vertices $v_0$, $v_1$ and $v_2$, and triangle 205B defined by vertices $V_3$, $V_4$ and $v_5$. As shown, the triangles 205A and 205B do not have common vertices; that is, they are independent primitives.

Figure 2D:
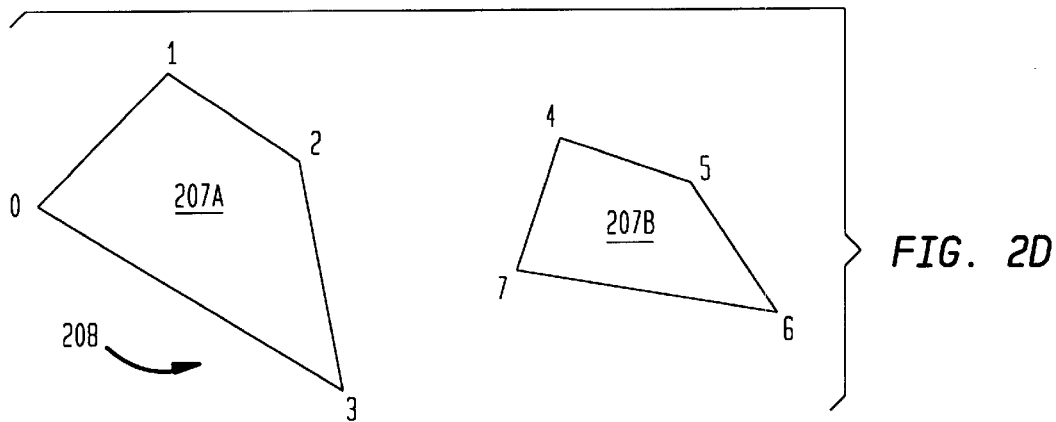
FIG. 2D is a diagram of a series of independent quadrilateral primitives which may be rendered on a computer display screen.

The command glBegin(GL_QUADS) specifies quadruples of vertices interpreted as four-sided polygons. Specifically, the command causes graphics system 100 to draw a series of quadrilaterals (four-sided polygons) using vertices $v_0$, $v_1$, $V_2$, $V_3$, then $V_4$, $V_5$, $V_6$, $V_7$, and so on. If n is not a multiple of 4, the final one, two, or three vertices are ignored. Referring to FIG. 2D, the quadrilaterals 208 include a quadrilateral 207A drawn between vertices $v_0$, $v_1$, $v_2$, and $V_3$ and quadrilateral 207B drawn by vertices $V_4$, $V_5$, $V_6$, and $V_7$. As shown, the quadrilaterals 207A and 207B do not share a common vertex and are, therefore, independent quadrilaterals.

The command glBegin(GL_LINE_STRIP) specifies a series of connected line segments. Specifically, the command draws a line segment from $v_0$ to $v_1$, then from $v_1$ to $v_2$, and so on, finally drawing the segment from $v_{n-2}$ to $V_{n-1}$. Thus, a total of n−1 line segments are drawn. Nothing is drawn unless n is larger than 1. There are no restrictions on the vertices describing a line strip primitive; the lines can intersect arbitrarily. Referring to FIG. 2E, line strip 210 is comprised of line 209A drawn between vertices $v_0$ and $v_1$, line 209B drawn between vertices $v_1$ and $v_2$, line 209C drawn between vertices $v_2$ and $V_3$, line 209D drawn between vertices $V_3$ and $V_4$ and line 209E drawn between vertices $V_4$ and $V_5$. As shown, each of these lines 209A–209E is connected to form a single line strip 210 primitive.

The command glBegin(GL_TRIANGLE_STRIP) specifies a linked strip of triangles. Specifically, the command causes graphics system 100 to draw a series of triangles (three-sided polygons) using $v_0$, $v_1$, $v_2$, then $V_2$, $v_1$, $V_3$, then $V_2$, $v_3$, $v_4$, and so on. The ordering is to ensure that the triangles are all drawn with the same orientation so that the strip can correctly form part of a surface. n must be at least 3 for anything to be drawn. Referring to FIG. 2F, triangle strip 212 is comprised of triangle 211A drawn between vertices $v_0$, $v_1$ and $V_2$, triangle 211B drawn between by vertices $v_1$, $v_2$ and $V_3$, triangle 211C drawn between defined by vertices $V_2$, $V_3$ and $V_4$, triangle 211D drawn between vertices $V_3$, $v_4$ and $v_5$, triangle 211E drawn between vertices $V_4$, $V_5$ and $V_6$ and triangle 211F drawn between vertices $v_5$, $V_6$ and $V_7$. As shown, the triangles 211A–211F are drawn with the same orientations to form a triangle strip primitive 212.

The command glBegin(GL_QUAD_STRIP) specifies a linked strip of quadrilaterals. Specifically, the command causes graphics system 100 to draw a series of quadrilaterals (four-sided polygons) beginning with $v_0$, $v_1$, $V_3$, $V_2$, then $V_2$, $V_3$, $V_5$, $V_4$, then $V_4$, $V_5$, $V_7$, $V_6$, and so on. n must be at least 4 before anything is drawn. If n is odd, the final vertex is ignored. Referring to FIG. 2G, the quadrilateral strip 214 is comprised of quadrilateral 213A drawn between vertices $v_0$, $V_1$, $V_2$ and $V_3$, quadrilateral 213B drawn between vertices $V_2$, $V_3$, $V_4$, and $v_5$, and quadrilateral 213C drawn between vertices $V_4$, $V_5$, $v_6$ and $v_7$. As shown, neighboring quadrilaterals have two shared vertices and, therefore, share a common side with at least one neighboring quadrilateral.

Figure 2H:
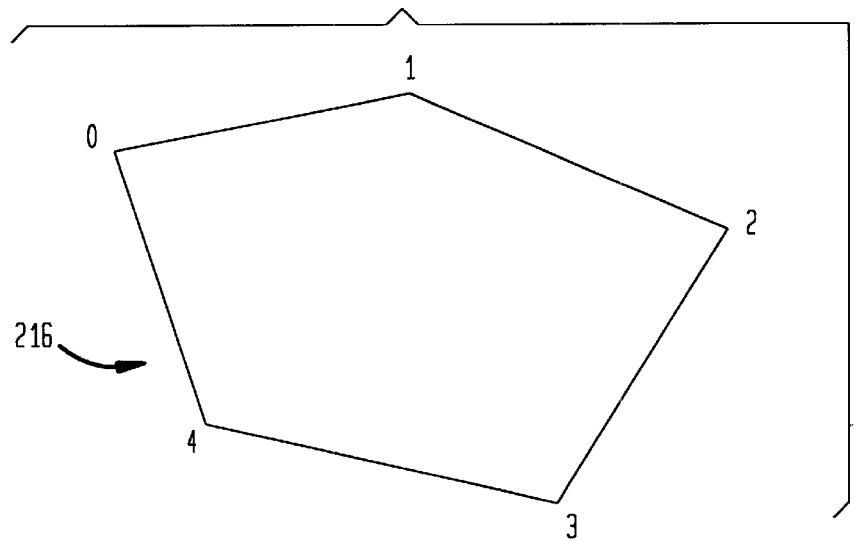
FIG. 2H is a diagram of a polygon primitive which may be rendered on a computer display screen.

The command glBegin(GL_POLYGON) specifies the boundary of a simple, convex polygon. Specifically, the command causes graphics system 100 to draw a polygon using the points $v_0, \ldots, v_{n-1}$, as vertices. n must be at least 3, or nothing is drawn. If the vertices do not satisfy these conditions, the results are unpredictable. Referring to FIG. 2H, polygon 216 is defined by vertices $v_0$, $v_1$, $V_2$, $V_3$ and $V_4$. As shown, the polygon 216 is convex; that is, a line connecting any two points within the polygon 216 does not intersect any boundary of the polygon.

Figure 2I:
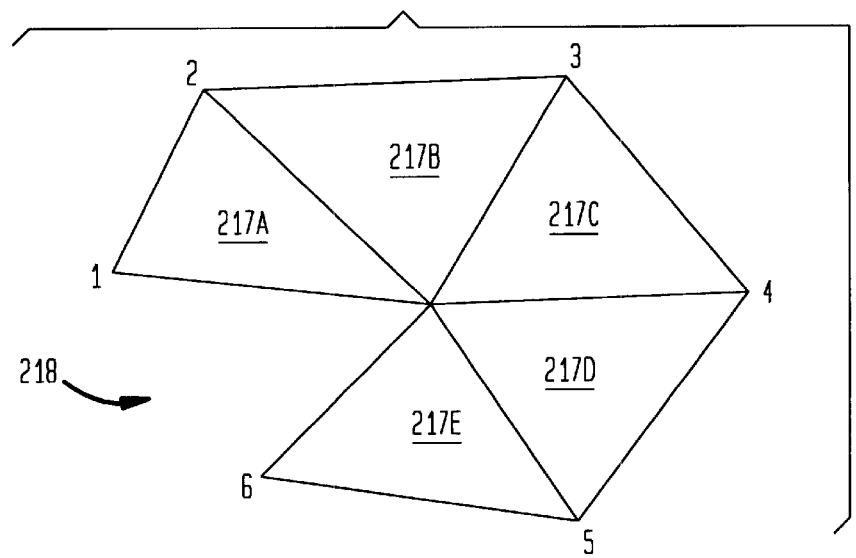
FIG. 2I is a diagram of a triangle fan primitive which may be rendered on a computer display screen.
Figure 2J:
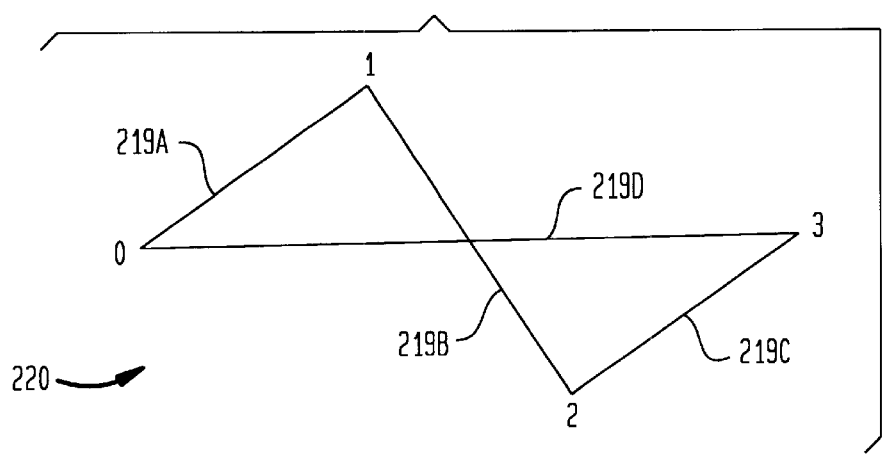
FIG. 2J is a diagram of a line loop primitive which may be rendered on a computer display screen.

The command glBegin(GL_TRIANGLE_FAN) specifies a linked fan of triangles. Specifically, the command causes graphics system 100 to draw a series of triangles (three-sided polygons) using $v_0$, $v_1$, $v_2$, then $v_0$, $V_2$, $V_3$, then $v_0$, $V_3$, $V_4$, and so on. n must be at least 3 for anything to be drawn. Referring to FIG. 2I, the triangle fan 218 includes triangle 217A drawn between vertices $v_0$, $v_1$ and $v_2$, the triangle 217B drawn between vertices $v_0$, $v_2$ and $V_3$, the triangle 217C drawn between vertices $v_0$, $V_3$ and $V_4$, the triangle 217D drawn between vertices $v_0$, $V_4$ and $V_5$ and the triangle 217E drawn between vertices $v_0$, $v_5$ and $v_6$. As shown, neighboring triangles have two common vertices, vertex 0 and one other vertex.

The command glBegin(GL_LINE_LOOP) specifies a series of connected line segments, with a segment added between the last and first vertices. Specifically, the command causes graphics system 100 to draw a line segment from $v_0$ to $v_1$, then from $v_1$ to $V_2$, and so on, drawing a line segment from $v_{n-2}$ to $V_{n-1}$. When the glEnd (1) is received, a final line segment is drawn from $v_{n-1}$ to $v_0$, completing the line loop. Thus, a total of n line segments are drawn. Nothing is drawn unless n is larger than 1. There are no restrictions on the vertices describing a line loop; the lines can intersect arbitrarily. For example, referring to FIG. 2J, a line loop 220 is comprised of line segment 219A drawn between vertices $v_0$ and $v_1$, line 219B drawn between vertices $v_1$ and $v_2$, line 219C drawn between vertices $v_2$ and $V_3$ and line 219D drawn between vertices $V_3$ and $v_0$. As shown, the final line segment, line 219D, completes the line loop primitive 220.

As noted, graphics systems in general, and those that support OpenGL specifically, behave as a state machine. Accordingly, a specified state value remains in effect until it is changed, with all subsequently-received vertices being rendered with the current state value. As a result, when the graphics vertex call (glVertex( ) in OpenGL) is issued, current state values are used to render the specified vertex. States may include, for example, the normal vector coordinates, texture coordinates, current viewing and projections transformations, line and polygon stipple patterns, polygon drawing modes, pixel-packing conventions, positions and characteristics of lights, and material properties of the objects being drawn, to name a few. Typically, states are enabled or disabled with the graphics calls glEnable( ) and glDisable( ), respectively. The text appearing within the parentheses represents the type of property and the state value which is being enabled or disabled. In the described aspects of the invention, the data that is stored in a display list memory representing a primitive, referred to herein as primitive data, includes vertex and state information, although other arrangements may be used.

Graphics commands issued in a graphics system may be executed immediately, causing the specified primitives to be rendered immediately on the appropriate output device. In OpenGL, this is referred to as "immediate mode." Some graphics systems also allow graphics application programs to store graphics call sequences for future execution. For example, OpenGL provides a "display list mode" which allows graphics application programs to store OpenGL commands as a display list for future execution, rather than executing them immediately. After storing OpenGL commands in a display list memory, a graphics system executes the display list, causing the stored graphics calls to be executed in the order in which they were issued. Commands issued in immediate mode and commands issued in display list mode may be mixed within a single model rendering. It may be desirable to use display list mode, for example, to cache commands in a display list that will be redrawn multiple times. In a graphics system implementing OpenGL, a graphics application program creates a display list using the glNewList( ) command. Any OpenGL commands issued between glNewList( ) and glEndList( ) commands are stored in the display list memory. The graphics application program can then execute the display list at any time using the glCallList( ) command. Multiple display lists may exist at any time.

Figure 4A:
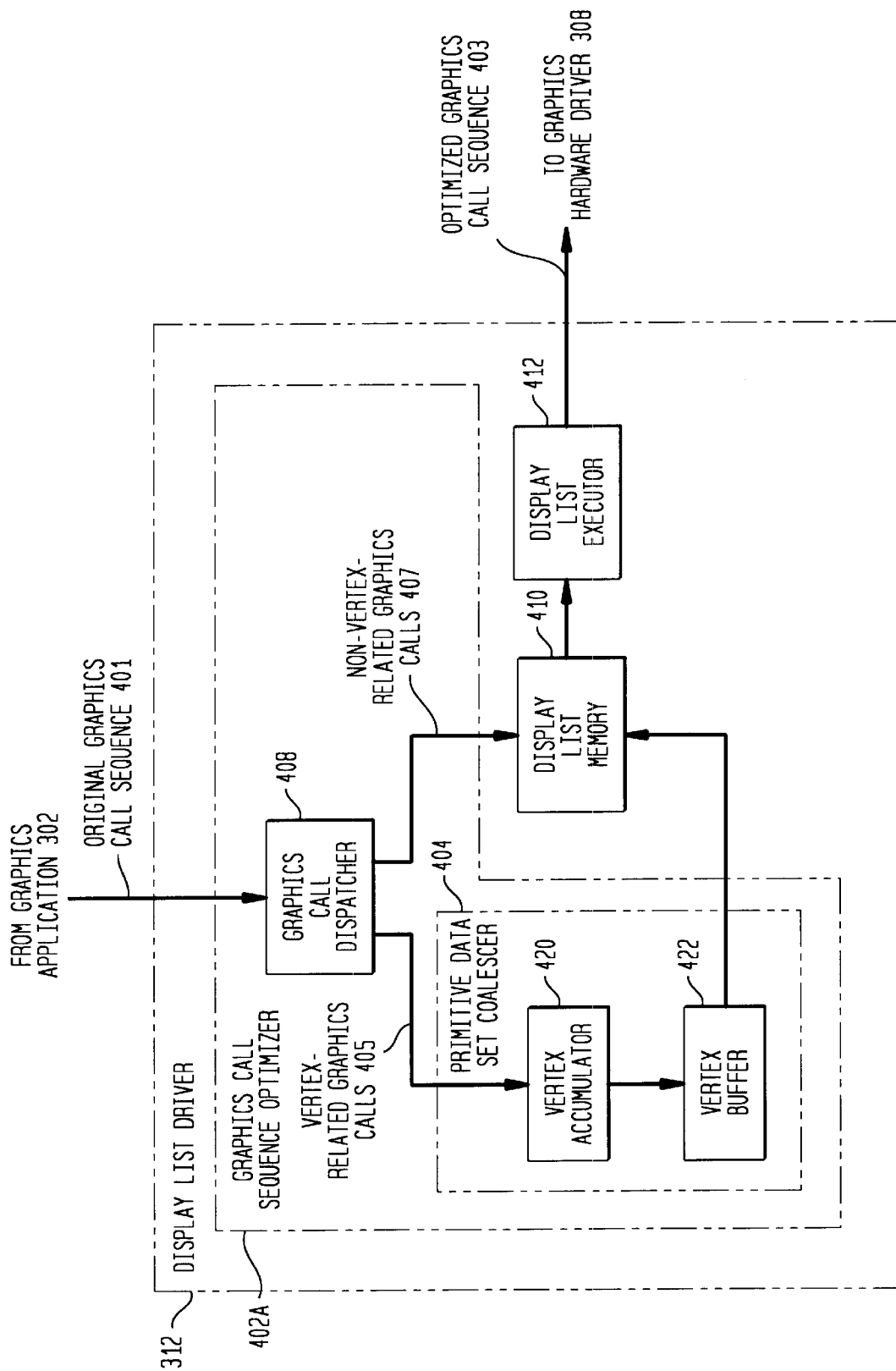
FIG. 4A is a block diagram of one aspect of a graphics call sequence optimizer of the present invention.
Figure 4B:
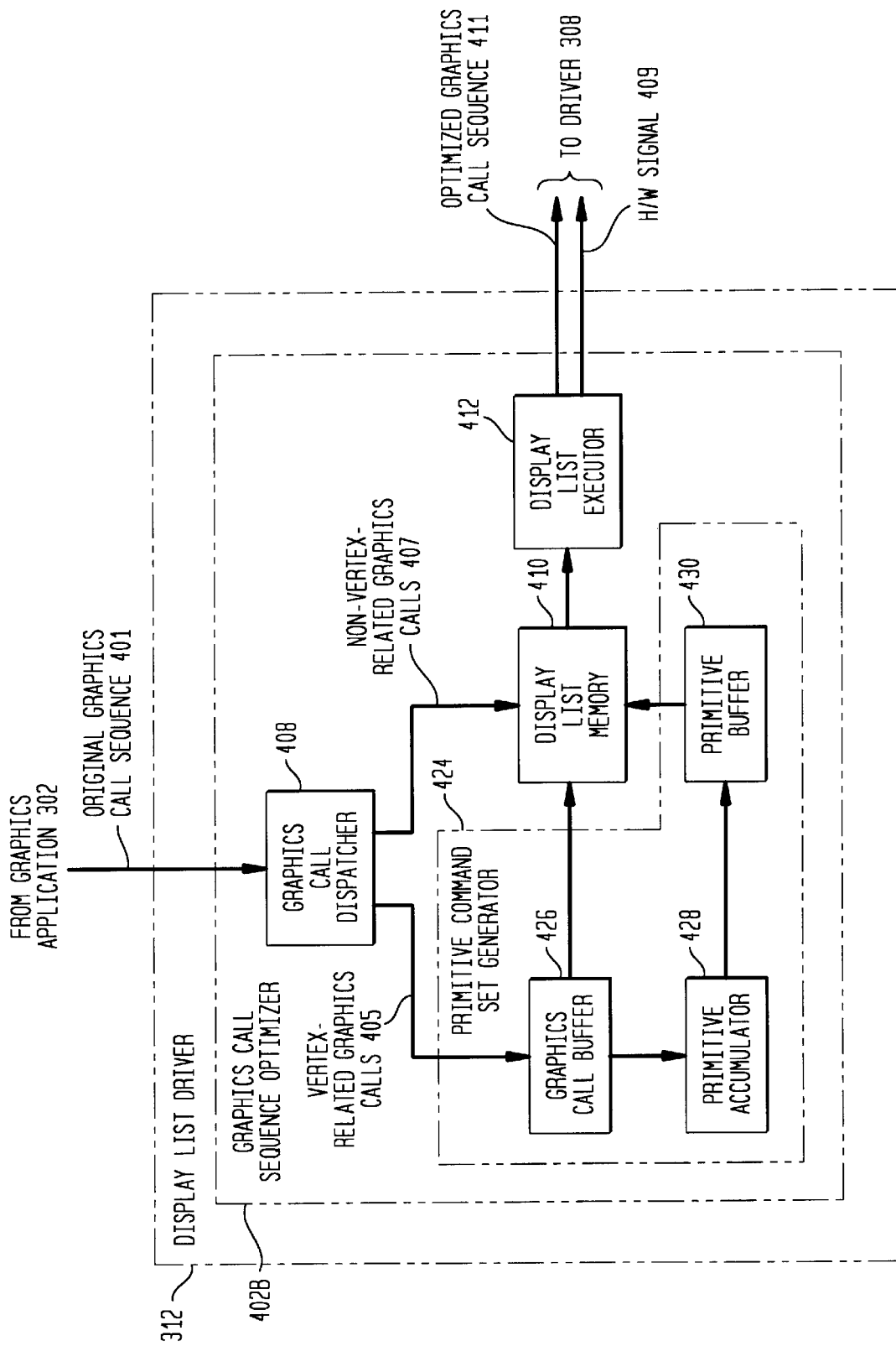
FIG. 4B is a block diagram of one embodiment of another aspect of a graphics call sequence optimizer of the present invention.
Figure 4C:
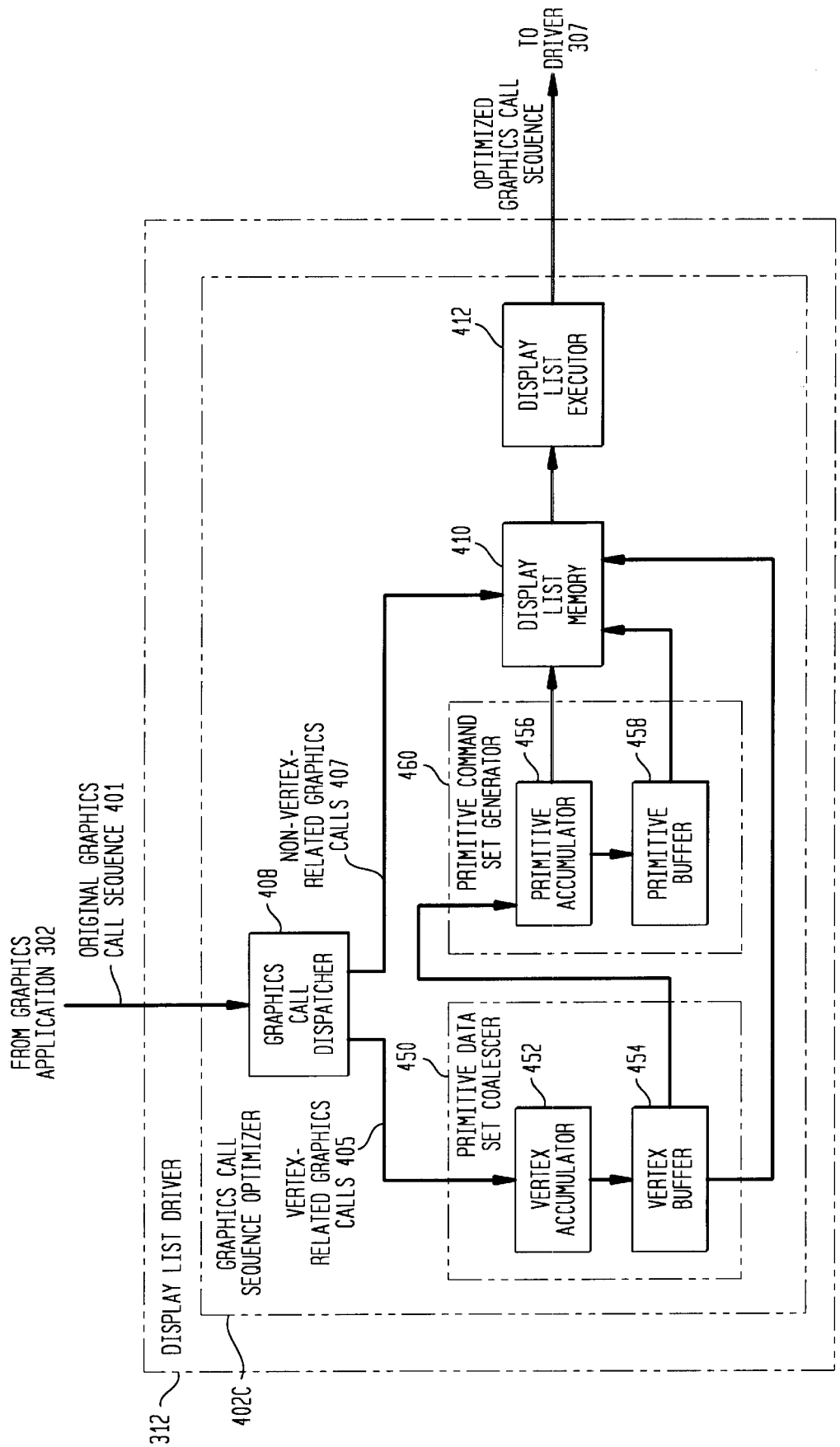
FIG. 4C is a block diagram of one embodiment of a still further aspect of a graphics call sequence optimizer of the present invention.

Exemplary aspects of the present invention are described below with respect to an exemplary implementation as a graphics call sequence optimizer 402 implemented in display list driver 312. Apparatus embodiments of these disclosed aspects are illustrated in FIGS. 4A–4C. In general, graphics application program 302 generates an original graphics call sequence 401 for storage in a display list memory 410 as a display list which is to be executed by display list executor 412. In the illustrative embodiments shown in FIGS. 4A–4C, display list memory 410 and display list executor 412 are implemented in display list driver 312 with graphics call sequence optimizer 402, although other configurations may be implemented. In accordance with the present invention, the disclosed graphics call sequence optimizers 402A–402C receive the original graphics call sequence 401 and generate an optimized graphics call sequence 403 that is stored in display list memory 410. Subsequently, display list executor 412 accesses display list memory 410 to execute the optimized graphics call sequence 403, forwarding the results of that execution to hardware driver 308. In certain aspects of the present invention, display list executor 412 implements well known techniques to perform its operations, while in other aspects of the invention, display list executor 412 implements novel techniques to process a primitive command set of the present invention.

As will become apparent from the following description, original graphics call sequence 401 is not required to, and is preferably not stored in, display list memory 410; only optimized graphics call sequence 403 is stored therein. When graphics application 302 instructs display list driver 312 to execute the optimized graphics call sequence stored in display list memory 410, display list executor 412 performs the execution by forwarding optimized graphics call sequence 403, rather than original graphics call sequence 401, to driver 308, resulting in optimized execution of the graphical primitives represented by original graphics call sequence 401. Preferably, optimized graphics call sequence 403 is generated in real-time; that is during run-time of the graphics system while graphics application 302 generates, and display list driver 312 receives, original graphics call sequence 401. This real-time execution of the operations of the present invention result in the generation of an optimized graphics call sequence 403 (and hardware signals, if any) that may be stored as a contiguous block in display list memory 410 and which can be processed efficiently by the graphics system, resulting in significant improvements in the efficiency with which models can be rendered.

It should be appreciated that the present invention is not limited to optimizing graphics call sequences issued in display list mode according to the OpenGL API. Rather, exemplary embodiments of the present invention are described herein with respect to the display list mode of OpenGL solely because this is the exemplary API implemented in host computer 108 to enable graphics application 302 to control graphics hardware 100. It should be appreciated that the present invention is not limited in this respect, and that the present invention may be used in conjunction with any sequence of graphics calls having the characteristics noted below that are generated by a graphics application program in accordance with any graphics system API.

As defined herein, original graphics call sequence 401 includes a plurality of graphics calls and primitive data sets. As noted, each such primitive data set includes a plurality of vertex-related graphics calls 405. As defined herein, vertex-related graphics calls 405 comprise those graphics calls that are directed to the rendering of vertices and may include, for example, vertex graphics calls that specify vertices as well as graphics calls directed to the rendering of the specified vertices, such those that set property and material states. Original graphics call sequence 401 also includes graphics calls directed to setting or specifying values not related to vertices, referred to herein as non-vertex-related graphics calls 407. In the OpenGL API, for example, such graphics calls include graphics calls associated with specifying modal state values. In accordance with the OpenGL API, such graphics calls do not occur within a primitive data set.

FIG. 4A illustrates one aspect of a graphics call sequence optimizer 402A. Graphics call sequence optimizer 402A includes a primitive data set coalescer 404 that coalesces two or more primitive data sets occurring in original graphics call sequence 401 to form a coalesced primitive data set that ultimately occurs in optimized graphics call sequence 403. The coalesced primitive data set causes the same rendering by graphics hardware 304 as the primitive data sets that occurred in original graphics call sequence 401. In particular, coalescer 404 coalesces graphics primitive data sets of the same primitive type in original graphics call sequence 401 into a single coalesced graphics primitive data set that specifies the same number of primitives of the same type as the plurality of primitive data sets in the original sequence 401. Vertex accumulator 420 temporarily stores graphics calls in a vertex buffer 422 in an attempt to form a coalesced primitive data set.

In one embodiment, vertex accumulator 420 eliminates all glBegin( ) and glEnd( ) calls from the adjacent primitive data sets in original graphics call sequence 401, storing in a vertex buffer 422 only the glBegin( ) call of the first primitive data set and the glEnd( ) call of the last primitive data set that occurred in original graphics call sequence 401. The elimination of glBegin( ) and glEnd( ) calls both reduces the amount of storage space necessary to store graphics primitive data sets (e.g., in display list memory 410), and increases the efficiency with which the graphics primitives can be executed by eliminating the execution overhead associated with the eliminated glBegin( ) calls. Vertex accumulator 420 also stores all other vertex-related graphics calls 405 that occur between the retained glBegin( ) and glEnd( ) graphics calls in vertex buffer 422 in the order in which they are received. In one embodiment of the present invention, vertex accumulator 420 accumulates the vertices between the glBegin( ) graphics call and the glEnd( ) graphics call in vertex buffer 422 as the multiple graphics primitive data sets are being generated, and then flushes the resulting coalesced (optimized) graphics primitive data set from vertex buffer 422 to display list memory 410 for subsequent execution and rendering on an output device.

As shown in FIG. 4A, optimizer 402 also includes a graphics call dispatcher 408 that distinguishes between vertex-related graphics calls 405 and non-vertex-related graphics calls 407, forwarding the latter directly to display list memory 410 and forwarding the former to coalescer 404 as they are received. When original graphics call sequence 401 includes a non-vertex-related graphics call 407, coalescer 404 ceases coalescing primitive data sets and forwards the graphics calls accumulated thus far in vertex buffer 422 to display list memory 410. To insure the sequence of graphics calls in original graphics call sequence 401 is retained, vertex buffer 422 is flushed prior to dispatcher 408 forwarding non-vertex-related graphics call 407 to display list memory 410.

Typically, graphics vertex calls occurring in a graphics call sequence have the same format. To enable efficient access to vertex buffer 422 and display list memory 410, in one particular embodiment, vertex accumulator 420 configures vertex buffer 422 to receive primitive data of a particular format based upon the format of the first graphics vertex call of the first primitive data set to be accumulated. For example, in the OpenGL API, if the first vertex graphics call is to be received after a glColor( ) graphics call, vertex buffer 422 is configured to receive primitive data that includes color and vertex values. Vertex accumulator 420 accumulates graphics calls until the format of the graphics calls changes, at which time vertex buffer 422 is flushed to display list memory 410. Continuing the OpenGL example, if a subsequent vertex graphics call requires a different configuration of vertex buffer 422 due to, for example, receipt of glNormal( ) or glMaterial graphics calls, vertex buffer 422 is flushed to display list memory 410. Thus, primitive data set coalescer 404 coalesces vertex-related graphics calls 405 that form a series of sequentially occurring primitive data sets directed to the rendering of a same primitive type into a single, coalesced primitive data set that causes the rendering of the same primitives of the same type as the original primitive data sets.

Referring to FIG. 4B, in another aspect of the present invention, graphics call sequence optimizer 402B includes a primitive command set generator 424. Generator 424 combines consecutive graphics primitive data sets, each of which specifies a same or different primitive type, into a single graphics primitive command set that, when executed, effects a same rendering on an output device as the plurality of graphics primitive data sets of which it is a combination. The primitive command set is preferably stored in a single contiguous region of display list memory 410 and is executed efficiently by display list executor 412. That is, display list executor 412 may execute the graphics primitive command set (when display list memory 410 is subsequently executed) without incurring execution overhead typically associated with executing multiple graphics primitive data sets. For example, primitive command set generator 424 may combine a triangle strip primitive data set followed immediately by a line strip primitive data set into a graphics primitive command set. Execution of the single primitive command set effects a same rendering on an output device as the triangle strip primitive data set followed by the line strip primitive data set.

In the illustrative embodiment, generator 424 includes a primitive accumulator 428 that accumulates complete graphics primitive data sets in a primitive buffer 430 as the graphics primitive data sets are being generated by graphics application 302. The graphics calls are initially stored in graphics call buffer 426 as they are received.

In one embodiment of the present invention, the accumulated graphics state calls include any graphics calls that affect the rendering of a graphics primitive on an output device. For example, in one embodiment of the present invention in which the graphics system API 303 is implemented according to the OpenGL standard, graphics state calls include glMatrix( ), glLineWidtho, and glNormal( ) graphics state calls. However, these particular graphics state calls and the use of the OpenGL standard are purely exemplary, and are not limitations of the present invention.

In one embodiment of the present invention, primitive accumulator 428 accumulates graphics primitive data sets until a non-vertex-related graphics call is received, at which time the graphics primitive data set(s) stored in primitive buffer 430 is/are flushed to display list memory 410 for subsequent execution and rendering on an output device.

Primitive accumulator 428 analyzes the sequentially generated primitive data sets in original graphics call sequence 401 to make the necessary determinations described below to create the primitive command set. In the illustrative embodiment, primitive command set generator 424 includes a graphics call buffer 426 that receives and stores vertex-related graphics calls 405 forming one or more primitive data sets. As shown in FIG. 4B, graphics call buffer 426 may flush its contents to display list memory 410 under certain circumstances, depending on the implemented embodiment of the present invention. In certain embodiments, for example, graphics call buffer 426 is flushed to display list memory 410 when vertex calls having a different format have been received, or when the primitive buffer 430 becomes full. These features of the invention are described in greater detail below.

Primitive accumulator 428 analyzes vertex-related graphics calls 405 that have been accumulated in graphics call buffer 426 for storage in primitive buffer 430 as complete primitive data sets in a primitive command set. In addition to the complete primitive data sets, primitive accumulator 428 inserts, as a first command of the primitive command set, what is referred to herein as a primitive set command. As will be described in detail below, the presence of the primitive set command notifies display list executor 412 that the primitive data sets of the primitive command set that immediately follows the primitive set command are to be executed in accordance with the present invention.

Referring to FIG. 4C, in a further aspect of the present invention, graphics call sequence optimizer 402C includes both a primitive data set coalescer 450 and a primitive command set generator 460. As shown in FIG. 4C, primitive command set generator 460 does not include a graphics call buffer 426. As will be described in further detail below, vertex buffer 454 performs the functions of vertex buffer 422 (FIG. 4A) and graphics call buffer 426 (FIG. 4B). That is, vertex buffer 454 stores vertex-related graphics calls 405 which are either flushed to display list memory 410 or provided to primitive command set generator 460, depending on various conditions described below. In general, vertex accumulator 452 attempts to coalesce a sequence of graphics primitive data sets into a single graphics primitive data set in vertex buffer 454. If vertex accumulator 452 cannot coalesce the sequence of graphics primitive data sets into a single graphics primitive data set (because, for example, the graphics primitive data sets are not of the same type), vertex accumulator 450 passes control to primitive accumulator 456. Primitive accumulator 456 combines the sequence of graphics primitive data sets in the vertex buffer 454 into a single graphics primitive command set in primitive buffer 458.

It should be appreciated that graphics command dispatcher 408, vertex accumulator 452, vertex buffer 454, primitive accumulator 456, and primitive buffer 458 are merely exemplary and are not limitations of the present invention. For example, graphics commands may be sent directly to the vertex accumulator 452 or the primitive accumulator 456 without the use of the graphics command dispatcher 408. Furthermore, the invention may be implemented without either of vertex buffer 454 or primitive buffer 458, and vertex buffer 454 and the primitive buffer 458 may be combined into a single buffer for performing the noted functions. Other alternative embodiments of the graphics call sequence optimizer 402C will be apparent to one of ordinary skill in the art.

Furthermore, it should be appreciated that the display list memory 410 need not be implemented as a component of the display list driver 312. Rather, a display list memory used in conjunction with embodiments of the present invention may be any storage means used by a graphics system to store graphics call sequences to be executed by graphics hardware.

Figure 5B:
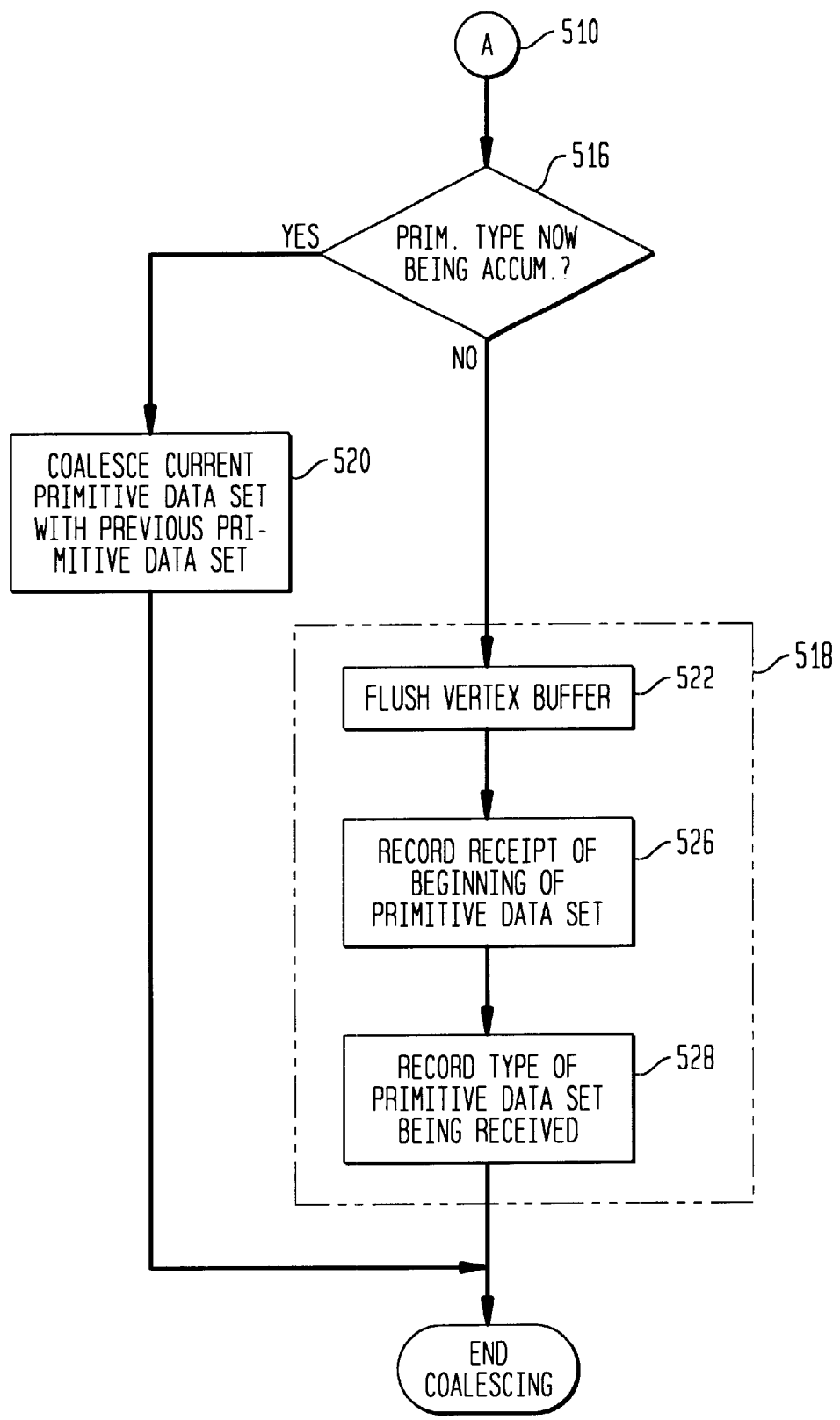
Figure 5C:
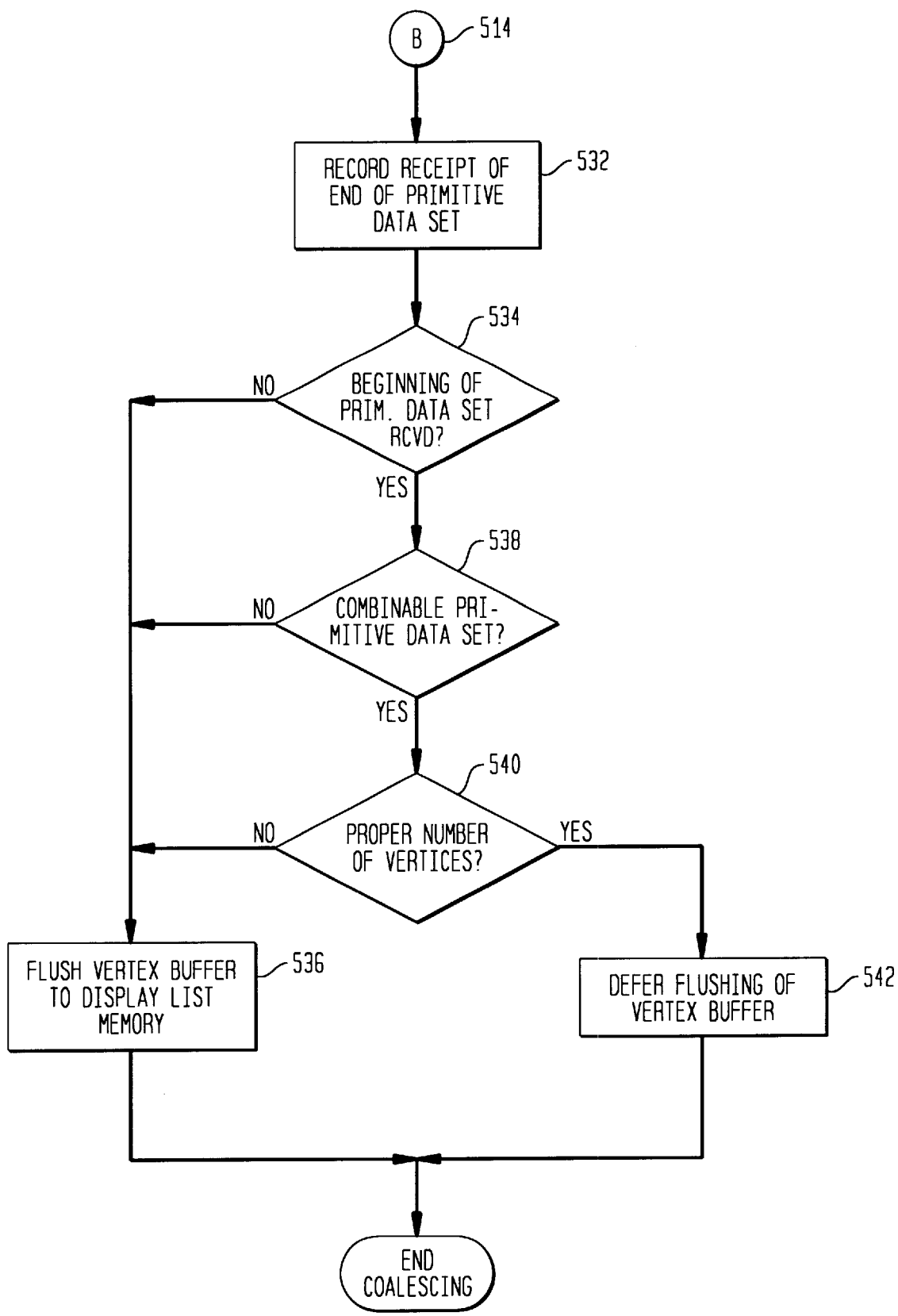

FIGS. 5A–5C are a high-level flow chart of one embodiment of a process 500 for coalescing graphics primitive data sets of the same primitive type performed in accordance with one embodiment of the present invention. For purposes of example only, process 500 is described with respect to an original graphics primitive sequence 650 shown in FIG. 6. Process 500 may, however, be used in conjunction with any other original graphics primitive sequence, as should be apparent from this disclosure.

Referring to FIGS. 5A–5C, original graphics call sequence 650 contains two primitive data sets 660, 662, each rendering a single triangle primitive, for a total of ten continuous graphics calls 652A–652J. In one embodiment of the present invention, each of the commands 652A–J in original graphics primitive sequence 650 is received by display list driver 312 when commands 652A–J are generated by graphics application 302 for storage in display list memory 410. As described in more detail below, graphics call sequence optimizer 402A may execute process 500 to generate, from original graphics primitive sequence 650, an optimized graphics primitive sequence 654 containing eight graphics calls 656A–656H, including only one glBegin( )/glEnd( ) pair that provides for the same rendering on graphics system 100 as would have been achieved by implementing original graphics call sequence 650.

The exemplary process 500 executed by graphics call sequence optimizer 402A for optimizing graphics primitive calls is now described in more detail. When graphics application 302 generates a glNewList( ) command, all subsequent graphics commands generated by graphics application 302 are intercepted by display list driver 312. When display list driver 312 receives a graphics call from graphics application 302, display list driver 312 forwards the command to graphics call sequence optimizer 402A. Receipt of the command invokes process 500 at step 501. According to one embodiment of the present invention, graphics call dispatcher 408 forwards vertex-related graphics calls 405 to primitive data set coalescer 404 to perform an action based on the type of graphics call received. The way in which coalescer 404 processes graphics commands will now be described with respect to the illustrative original graphics call sequence 650 shown in FIG. 6.

Optimizer 402A first determines whether a vertex-related graphics call 405 or a non-vertex related graphics call 407 has been received at step 502. If a non-vertex-related graphics call 407 has been received, then optimizer 402A ceases coalescing primitive data sets, if any. At step 506, vertex buffer 422 is flushed to display list memory 410. At step 507, the non-vertex related graphics call 407 is then stored in display list memory 410. Subsequently, the coalescing process 500 ceases.

When a vertex-related graphics call 405 is received, the graphics call is forwarded to primitive data set coalescer 404. The process performed by primitive data set coalescer 404 is determined by the type of graphics call received. At step 504, coalescer 404 determines which type of graphics call has been received. If a glEnd( ) graphics call has been received, then the process shown in FIG. 5C is performed. If a glBegin( ) graphics call has been received, then the process 510 illustrated in FIG. 5B is performed. Otherwise, information descriptive of the graphics vertex calls are stored in vertex buffer 422 at step 530. Referring again to the example illustrated in FIG. 6, the first graphics command in original graphics primitive sequence 650 is a glBegin( ) command 652A with a mode argument of GL_TRIANGLES, indicating that the subsequent glVertex( ) graphics calls are to be interpreted as vertices of a triangle primitive. In one embodiment of the present invention, when glBegin( ) command 652A is received by graphics call sequence optimizer 402A (step 504), graphics call sequence optimizer 402A performs process 516 shown in FIG. 5B. Referring to FIG. 5B, vertex accumulator 420 determines at step 516 whether the primitive data set being received (e.g., primitive data set 660) is a type of primitive data set that is currently being accumulated by generator 404. In one embodiment of the present invention, vertex accumulator 420 determines whether the mode (i.e., GL__TRIANGLES) of the glBegin( ) command of the primitive data set being received (e.g., glBegin( ) graphics call 652A) is equal to the value of a variable named DeferredType which graphics call sequence optimizer 313 initializes to a null value when display list driver 312 is initialized.

As described in more detail below, when vertex accumulator 420 receives a glEnd( ) command for a graphics primitive data set (e.g., glEnd( ) command 652E) that is of a combinable primitive type (e.g., GL__TRIANGLES), vertex accumulator 420 defers flushing the primitive data set to display list memory 410 while vertex accumulator 420 determines whether it is possible to coalesce the primitive data set with subsequently received primitive data sets. In one embodiment, the value of DeferredType indicates the graphics primitive type whose flushing is currently being deferred. However, it should be appreciated that use of the DeferredType variable is purely exemplary, and is not a limitation of the present invention.

Returning to step 516 of FIG. 5B, because no graphics primitive data sets are currently being accumulated, the graphics primitive data set being received (e.g., graphics primitive data set 660) is not a type of graphics primitive data set that is currently being accumulated. As a result, vertex accumulator 420 prepares to begin accumulating vertex-related graphics calls (e.g., commands 652B–D) that will follow the glBegin( ) graphics call (e.g., glBegin( ) 652A).

Preparation to accumulate graphics commands, indicated by dashed box 518, includes flushing all vertices previously stored in vertex buffer 422 to display list memory 410 (step 522). As described above, vertex buffer 422 is a data structure used by vertex accumulator 420 to store information corresponding to vertex-related graphics calls 405 as they are being received from graphics application 302. When vertex accumulator 420 flushes vertex buffer 422 to display list memory 410, vertex accumulator 420 sends to display list memory 410 a glBegin( ) command whose mode argument indicates the mode (type) of primitive to be stored in display list memory 410, along with all graphics calls stored in vertex buffer 422, followed by a corresponding glEnd( ) graphics call. As noted, coalescer 404 flushes vertex buffer 422 at times when an incomplete primitive data set is stored in vertex buffer 422. At such times, a subset of the above information may be transferred to display list memory 410.

In the aspect of the invention illustrated in FIG. 4C; that is, an optimizer 402C that includes both, a primitive data set coalescer 450 and a primitive command set generator 460, the flushing of vertex buffer 454 is performed somewhat differently. In particular, when vertex buffer 454 is to be flushed, vertex accumulator 452 first determines whether a complete primitive data set is stored in vertex buffer 454. If not, the stored vertex-related graphics call information is transferred to display list memory 410 as described above. Should there be only complete primitive data sets stored in vertex buffer 454, then vertex accumulator 452 transfers the stored vertex-related graphics call information to primitive command set generator 460 for processing. This process is described in detail below. Thus, as noted above, in the illustrative embodiments of this aspect of the invention, vertex buffer 454 serves functions analogous to primitive data set buffer 426 described above with reference to the second aspect of the invention illustrated in FIG. 4B.

Referring again to FIGS. 4A and 5B, vertex accumulator 420 further prepares to accumulate graphics commands by recording the receipt of the beginning of a graphics primitive data set (step 526). As described in detail below with respect to step 534 (FIG. 5C), this recording is subsequently used to determine whether a complete graphics primitive data set, beginning with a glBegin( ) command and ending with a glEnd( ) command, has been received. In one embodiment of the present invention, vertex accumulator 420 uses a variable named CommandsReceived to store information about the graphics commands that have been received during accumulation. The variable CommandsReceived may be interpreted as a bit field, in which each bit indicates whether a particular kind of command has been received during accumulation. In one embodiment, vertex accumulator 420 sets the value of CommandsReceived to be equal to a constant named BeginMask, indicating that a glBegin( ) command (e.g., glBegin( ) 652A) has been received. Use of the CommandsReceived variable is purely exemplary, and is not a limitation of the present invention. Rather, any means may be used to indicate that commands, such as glBegin( ) and glEnd( ), indicating the beginning and end of a graphics primitive data set, have been received.

Vertex accumulator 420 also records the type of the primitive data set being received (step 528). Vertex accumulator 420 is now prepared to accumulate graphics commands following the first glBegin( ) command 652A. In one embodiment of the present invention, vertex accumulator 420 records the type of the primitive data set being received by setting a value of a variable named BeginType to be equal to the mode of the glBegin( ) call (in this case, GL__TRIANGLES). When graphics call sequence optimizer 402A is receiving graphics commands (e.g., glVertex( ) commands) within a graphics call sequence, the value of BeginType indicates the primitive type (e.g., GL__TRIANGLES) of the glBegin( ) command (also referred to as the "mode" of the glBegin( ) command) that was most recently received. A value of null indicates that no glBegin( ) command has yet been received. Use of the BeginType variable is purely exemplary, and is not a limitation of the present invention. Rather, any means may be used to indicate the type of the graphics primitive that was most recently received and/or to determine whether a previously received graphics primitive is of the same type as a subsequently received graphics primitive. In one embodiment of the present invention, graphics call sequence optimizer 402A initializes BeginType to a null value when the display list driver 312 is initialized.

Referring to FIGS. 5A and 5C, when graphics call sequence optimizer 402A receives glVertex( ) command 652B corresponding to the first vertex of the triangle (step 504), optimizer 402A instructs vertex accumulator 420 to store information descriptive of the glVertex( ) command 652B in vertex buffer 422 (step 530). For example, vertex accumulator 420 may store a record corresponding to glVertex( ) command 652B in vertex buffer 422, the record may include an indication that the record corresponds to a glVertex( ) command, including the arguments of the glVertex( ) command (e.g., x and y coordinates, properties, etc.). Similarly, vertex accumulator 420 stores information descriptive of the subsequent two glVertex( ) commands 652C and 652D in vertex buffer 422 when they are received.

When graphics call sequence optimizer 402A receives a glEnd( ) command, such as glEnd( ) command 652E (step 504), graphics call sequence optimizer 402A instructs vertex accumulator 420 to perform the process shown in FIG. 5C. Referring to FIG. 5C, vertex accumulator 420 records the receipt of the end of the primitive data set being received (step 532). In one embodiment of the present invention, receipt of the end of a primitive data set is recorded by setting an EndMask bit of the CommandsReceived variable. Vertex accumulator 420 verifies that the beginning of the primitive data set was previously received in order to verify that a complete graphics primitive data set was received (step 534). In one embodiment of the present invention, vertex accumulator 420 performs verification of step 534 by verifying that receipt of the beginning of the graphics primitive data set was recorded in step 526. In a further embodiment of the present invention, vertex accumulator 420 performs verification step 534 by verifying that the BeginMask bit of the CommandsReceived variable is set. If the verification performed in step 534 fails, vertex accumulator 420 flushes vertex buffer 422 to display list memory 410 (step 536), as described above.

Vertex accumulator 420 verifies that the primitive data set of which the glEnd( ) command is a part is a type of primitive data set that may be coalesced with other primitive data sets of the same type ("combinable primitive types"; step 538). In one embodiment of the present invention, such primitive data command sets are primitive data sets that specify independent primitive types. Each graphics vertex call in an independent primitive data set is used only once when executing the primitive data set; that is, the primitive data set represents one or more distinct graphics primitives. For example, in the OpenGL API, certain types of primitive data sets may include vertices which are interpreted as one or more independent graphics primitives. Such primitives include independent points, lines, triangles and quadrilaterals, and do not include line strips, triangle strips, and quadrilateral strips, since such primitives re-use vertices within the immediately previous primitive data set when being rendered. As one skilled in the relevant art would find apparent, the number and type of independent primitives which may be coalesced in accordance with the present invention is a function of the particular graphics API 303 which is implemented in graphics system 100. Accordingly, the primitives which may be coalesced may include the same, different, or additional primitives as those noted above. In an alternative embodiment, graphics call dispatcher 408 forwards sequences of independent primitive data sets of the same type to vertex accumulator 420, and forwards all other sequences of primitive data sets to display list memory 410.

If the primitive data set is determined not to be combinable at step 538, vertex accumulator 420 flushes vertex buffer 422 to display list memory 410 (step 536). If the primitive data set can be combined, vertex accumulator 420 then verifies that the correct number of vertices for the received primitive type have been received at step 540. If there is an insufficient number of graphic vertex calls to form a complete primitive, vertex accumulator 420 flushes vertex buffer 422 to display list memory 410 (step 536).

Success of the verifications of steps 534, 538, and 540 indicates that it is possible to coalesce the primitive data set for which a glEnd( ) was just received (e.g., the primitive data set 660) with the next primitive command set that is received (e.g., the primitive data set 662). As a result, vertex accumulator 420 defers flushing of the current graphics primitive data set (e.g., the primitive data set 660) to display list memory 410 (step 542). Vertex accumulator 420 may, for example, indicate that completion of the current primitive is to be deferred by setting a value of the variable DeferredType to be equal to the value of BeginType (which, in this example, is equal to the mode (type) of the glBegin( ) command 652A). The value of DeferredType will thereby indicate the type of the graphics primitive whose completion is being deferred. As described below, if the next graphics primitive data set received is of the same type as the graphics primitive data set just received, the two graphics primitive data sets may be coalesced into a single graphics primitive data set having a single glBegin( )/glEnd( ) pair to optimize their storage in display list memory 410 and their execution by display list executor 412.

Returning to the example of FIG. 6, when the second glBegin( ) command 652F is received by vertex accumulator 420, vertex accumulator 420 determines whether the primitive data set currently being received (primitive data set 662) is of a type that is currently being accumulated (primitive data set 660; step 516). Because, in this example, primitive data set 662 is of a type (GL_TRIANGLES) that is being accumulated, vertex accumulator 420 coalesces the graphics primitive data set being received (i.e., graphics primitive data set 662) with the previous graphics primitive data set (i.e., graphics primitive data set 660) (step 520 of FIG. 5B). In one embodiment of the present invention, vertex accumulator 420 coalesces the graphics primitive data set being received with the previous graphics primitive data set by clearing the EndMask bit of the CommandsReceived variable, indicating that the glEnd( ) command 652E from the previous graphics primitive data set 660 should not be stored in display list memory 410 after the glBegin( ) command 652A and the glVertex( ) commands 652B–D. When the three subsequent vertex calls 652G–652I are received by vertex accumulator 420, they are stored in vertex buffer 422, as described above with respect to steps 508 and 514.

When vertex accumulator 420 receives the glEnd( ) command 652J of graphics primitive data set 662 (step 504), vertex accumulator 420 records the receipt of the end of graphics primitive data set 662 (step 532). Referring again to FIG. 5C, and as described above, because (1) a glBegin( ) matching the glEnd( ) command 652J was received (step 534), (2) the primitive data set 562 is a combinable primitive type (step 538), and (3) the correct number of vertices for the primitive data set 662 were received (step 540), vertex accumulator 420 defers completion of the primitive data set 662 (step 542).

If a primitive data set that is not of the same primitive type, such as a quadrilateral primitive data set, follows the second triangle primitive data set 662, vertex accumulator 420 will determine (at step 516) that the type (GL_QUADS) of the graphics primitive data set is not a type that is currently being accumulated. As a result, vertex accumulator 420 will prepare to accumulate graphics commands following the glBegin( ) command (step 518), as described above. Vertex accumulator 420 begins by flushing vertex buffer 422 to display list memory 410, as described above (step 522). At the time that step 522 is performed, vertex buffer 422 will contain information corresponding to the optimized glVertex( ) commands 680 (FIG. 6). Therefore, flushing vertex buffer 422 to display list memory 410 will cause the optimized graphics primitive sequence 654 to be stored in display list memory 410. This optimized graphics primitive sequence 654 contains a single glBegin( ) command 656A whose mode is GL_TRIANGLES, followed by six glVertex( ) commands 656B–656H, followed by a single glEnd( ) command 656H.

In other words, the optimized graphic sequence 654 corresponds to the original graphics primitive sequence 650 with the intermediate glEnd( ) command 652E and glBegin( ) command 656F stripped out. It should be appreciated that subsequent commands comprising the quadrilateral primitive data set will not be included in the optimized graphics call sequence, and will be processed in a conventional manner.

It should be appreciated that, in one preferred embodiment of the present invention, vertex accumulator 420 coalesces commands corresponding to consecutive graphics primitive data sets of the same primitive type. Specifically, vertex accumulator 420 removes intermediate glBegin( ) and glEnd( ) commands, resulting in an optimized graphics primitive sequence 403 that begins with a single glBegin( ) command, that ends with a single glEnd( ) command, and that has no intervening glBegin( ) or glEnd( ) commands. The glBegin( ) command that begins the optimized graphics primitive sequence 403 is followed by a series of sets of vertices, each set of vertices corresponding to a single graphics primitive data set in the original graphics primitive sequence 401. Removing the intermediate glBegin( ) and glEnd( ) commands results in more efficient storage and execution of the graphics commands in display list memory 410. It should be further appreciated from the foregoing that vertex accumulator 420 simply flushes non-consecutive primitive commands to display list memory 410, resulting in their being processed conventionally. Thus, the vertex accumulator 420 results in more efficient storage and execution of consecutive graphics primitive data sets of the same primitive type, and does not result in any decrease in efficiency of storage and execution of other sequences of graphics commands.

The processes performed by embodiments of primitive command set generator 424 will now be described. As noted, generator 424 may be implemented as part of optimizer 402B as well as optimizer 402C of the invention. The following description addresses both such disclosed aspects.

In accordance with embodiments of this aspect of the invention, optimized graphics call sequence includes multiple consecutive graphics primitive data sets of the same or different primitive type stored as a graphics primitive command set in a single, contiguous data block in display list memory 410. Each graphics primitive command set contains information corresponding to a sequence of consecutive graphics primitive data sets. The graphics primitive command set may, for example, be stored in display list memory 410 as a single object. When display list executor 412 executes display list memory 410, execution of the primitive command set may be optimized by eliminating execution overhead typically associated with executing each of the graphics primitive data sets within the graphics primitive command set. In one embodiment of the present invention, primitive accumulator 420 combines graphics primitive data sets into graphics primitive command sets in real-time, i.e., without storing the graphics primitive data sets in display list memory 410.

Figure 7A:
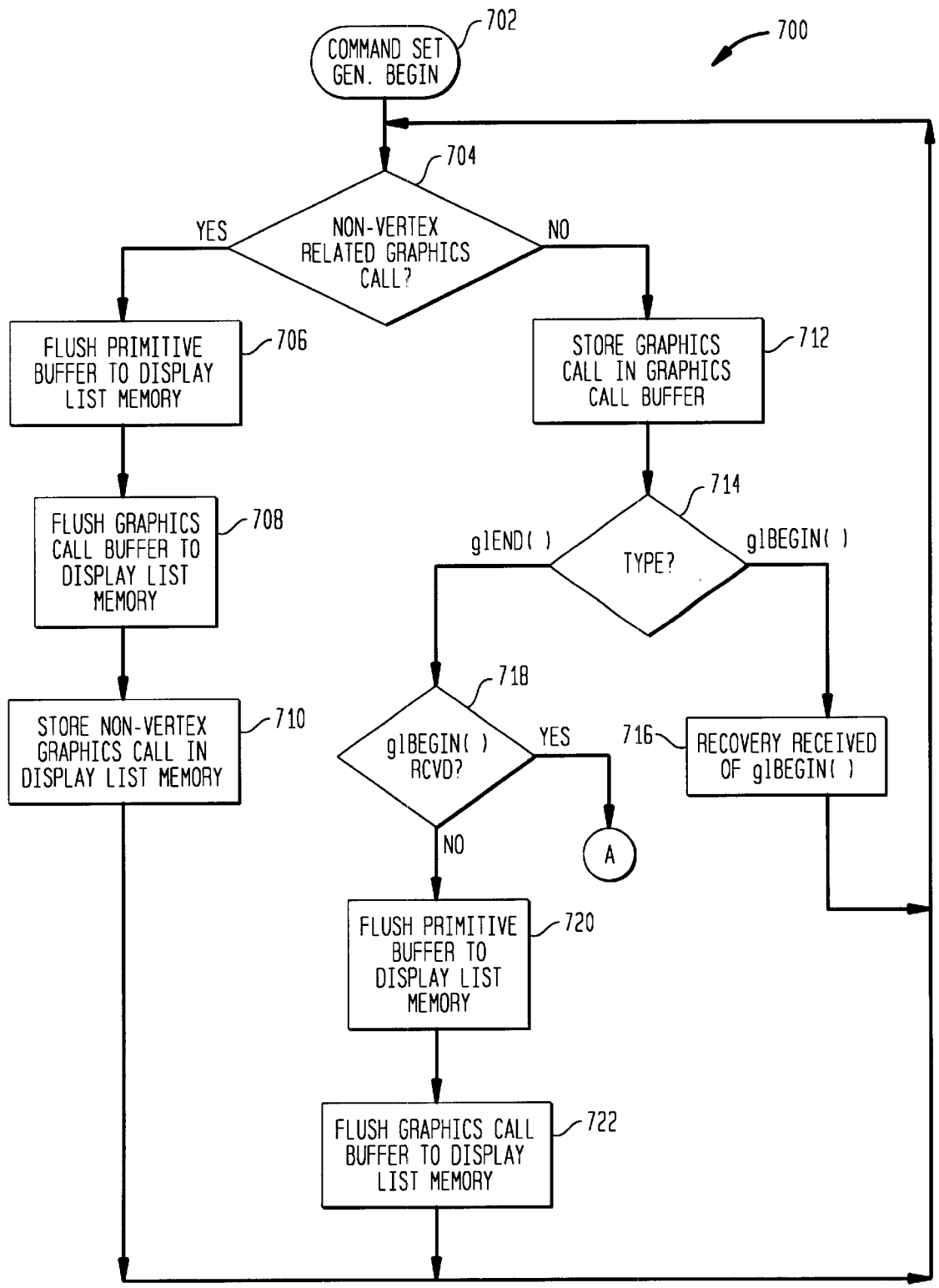
FIGS. 7A and 7B together form a flow diagram of procedures performed by one embodiment of the performance optimization system of the present invention to generate a primitive command set according to the present invention.
Figure 7B:
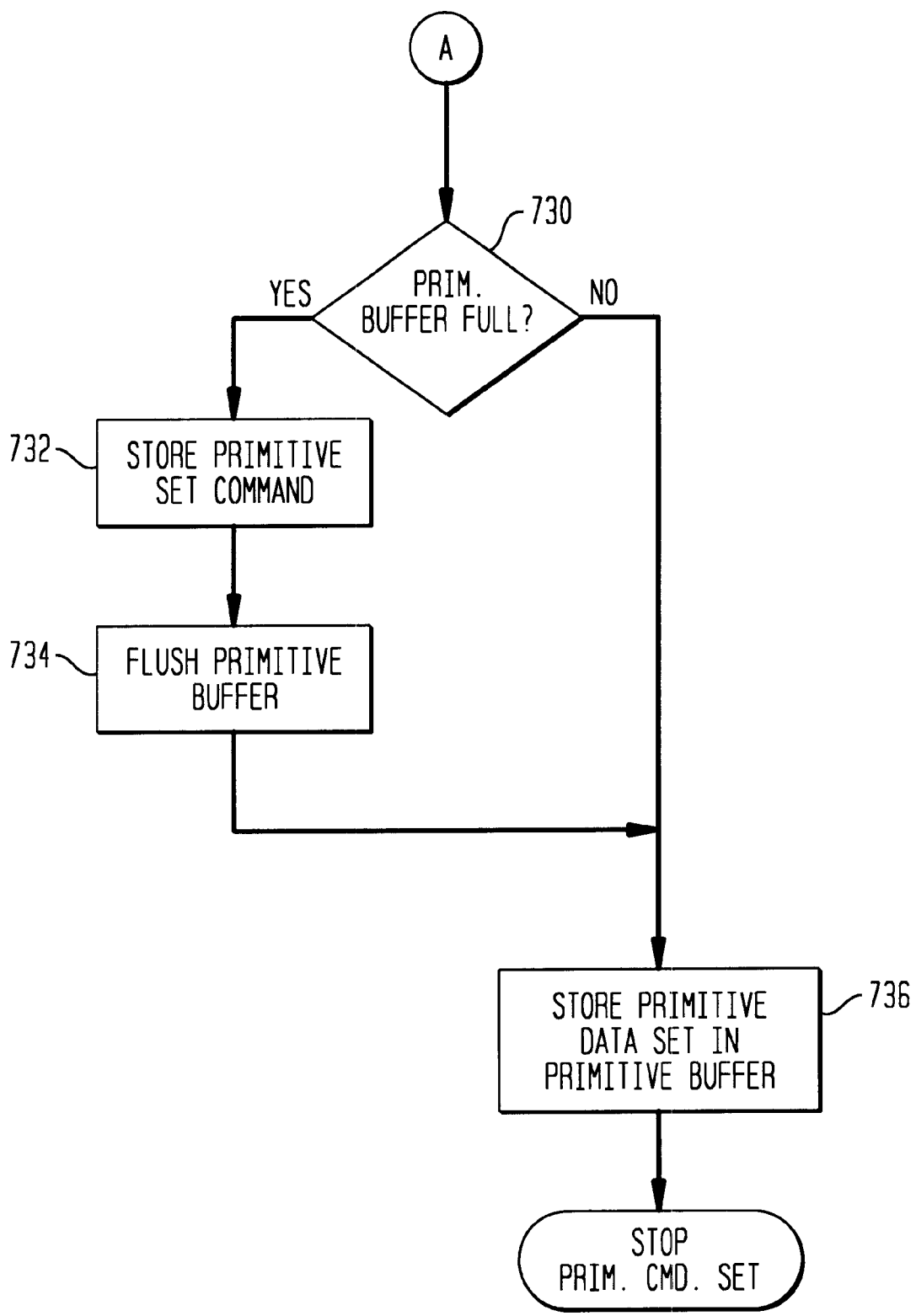

In one embodiment of the present invention, an exemplary method for optimizing graphics call sequences including graphics primitive data sets of different primitive types carried out by embodiments of graphics call sequence optimizer 402B, 402C, is shown in FIGS. 7A and 7B. This method will be described with reference to an exemplary original graphics primitive sequence 802 shown in FIG. 8. Original graphics primitive sequence 802 includes a triangle strip graphics primitive data set 804 including a glBegin( ) command 806A, four glVertex( ) commands 806B–E, and a glEnd( ) command 806F, as well as a line strip graphics primitive data set 808 including a glBegin( ) command 806G, three glVertex( ) commands 806H–J, and a glEnd( ) command 806K.

When graphics call sequence optimizer 402B receives an original graphics call sequence 401 it performs the following processes to generate optimized graphics call sequence 411 and hardware signals 409. Primitive command set generator 424 performs processes illustrated in FIGS. 7A and 7B to generate and store a primitive command set in display list memory 410. Display list executor 412 performs the processes illustrated in FIG. 9 to process the primitive command set stored in display list memory 410, generating optimized graphics call sequence 411 and hardware signals 409 for processing by driver 308. Referring to FIGS. 7A and 7B, if a non-vertex-related graphics call 407 is received, then all previous processes associated with the creation of a primitive command set cease and all graphics calls thus far accumulated are flushed to display list memory 410. In order to ensure that the graphics calls are stored in display list memory 410 in the proper sequence, steps 706, 708 and 710 are performed in the order shown in FIG. 7A. At step 706, primitive buffer 430 is flushed to display list memory 410. At step 708, graphics call buffer 426 is flushed to display list memory 410. Graphics call buffer 426 is flushed to display list memory 410 subsequent to primitive buffer 430 since the graphics calls stored in graphics call buffer 426 have been received after those which are stored in primitive buffer 400. After these two buffers are flushed to display list memory 410, the non-vertex-related graphics call 407 is forwarded to display list memory 410 at step 710.

If at step 704 it is determined that a vertex-related graphics call 405 has been received, then processing continues at step 712 whereat the graphics call is stored in graphics call buffer 426. Primitive accumulator 428 determines the type of graphics call 405 which has been stored in graphics call buffer 426 at step 714. If the graphics call is a glBegin( ), then primitive accumulator 428 records the receipt of the glBegin( ) at step 716. If the graphics call is determined to be a glEnd( ) graphics call at step 714, then primitive accumulator 428 performs some verification processing to determine whether a complete primitive data set has been received.

At step 718, primitive accumulator 428 determines whether a corresponding glBegin( ) has been previously received. If so, then processing continues at step 730 shown in FIG. 7B. If not, then an incomplete primitive data set has been received. Since a primitive command set includes complete primitive data sets, the generation of a primitive command set ceases. Primitive buffer 430 and graphics call buffer 426 are flushed to display list memory 410 at steps 720 and 722, respectively.

Returning to step 718, when primitive accumulator 428 determines that a complete primitive data set has been received, it determines whether primitive buffer 430 is full at step 730 (FIG. 7B). If so, primitive accumulator 428 stores a primitive set command in primitive buffer 430 at step 732, and primitive buffer 430 is flushed to display list memory 410 as a complete primitive command set at step 734. If primitive buffer 430 is determined to be not full at block 730, primitive accumulator 428 stores information descriptive of the graphics primitive data set in primitive buffer 430 at step 736. For example, referring to the example illustrated in FIG. 8, primitive accumulator 428 may store a record corresponding to graphics primitive data set 804 in primitive buffer 430, the record including an indicator of the mode (type) of primitive data set 804 (i.e., GL_TRIANGLE_STRIP), and information descriptive of each of the glVertex( ) commands 806B–E.

The glBegin(GL_LINE_STRIP) command 806G and the glVertex( ) commands 806H–J are processed as described above with respect to primitive data set 804. When primitive accumulator 428 stores primitive data sets in display list memory 410 as part of a primitive command set 820, primitive accumulator 428 first stores a function call, referred to herein as a primitive set command 822A, in display list memory 410 to identify the primitive data sets 824 that follow the primitive set command 822A as being part of an optimized primitive command set 820. As will be described below, display list executor 412 is configured to recognize the primitive set command 822A and to execute the associated primitive data set(s) 824 in accordance with embodiments of the present invention. The format of the primitive set command 822A may be any structure or content that provides display list executor 412 with the information necessary to execute primitive data set(s). For example, in one embodiment, the primitive set command includes information such as the number of primitives and number of vertices that are included in each primitive data set 824. The format may be any format, preferably similar to that currently processed by display list executor 412. Furthermore, any mechanism may be used by primitive accumulator 428 to notify the display list executor 412 of the presence of the primitive command set 820. For example, a single bit in a control word, a dedicated data line or bus, or other mechanism may be used, all of which are considered to be within the scope of the present invention. It should also be understood that the optimized primitive command set 820 may include any number of primitive data sets 824. For example, should a non-vertex-related graphics call be received after a complete primitive data set 824 is stored in primitive buffer 430, then the single primitive data set 824, preceded by a primitive set command, will be flushed to display list memory 410.

In one embodiment of the present invention, display list executor 412 executes the primitive command set 820 in an optimized manner, as described in detail below. In conventional systems, when a display list executor executes a glBegin( ) graphics call, the display list executor performs certain overhead operations. For example, a typical display list executor may (1) verify that the value of the mode argument of the glBegin( ) command is valid, (2) determine whether any graphics commands affecting the graphics state have been issued since the last glBegin( ) command was issued, (3) verify that a glEnd( ) was received prior to receiving the glBegin( ) (i.e., verify that two glBegin( ) commands have not been received without an intervening glEnd( ) command); and (4) transmit a signal to the hardware graphics driver indicating that a glBegin( ) command specifying a particular mode (primitive type) has been issued. If, for example, the display list executor in a conventional system determines that a graphics command effecting the graphics state (e.g., glMatrix( )) has been issued since the last glBegin( ) command was issued, the display list executor may modify the graphics state accordingly.

The inventor has determined that when a sequence of graphics primitive data sets each having a valid mode is generated without any intervening graphics mode commands, performing steps (1)–(3) before executing each graphics primitive data set 824 is inefficient. After steps (1)–(3) have been performed for the first graphics primitive data set, they need not be performed for subsequent graphics primitive data set(s). In one embodiment of the present invention, display list executor 412 only carries out such steps for the first graphics primitive data set 824 in a sequence of one or more graphics primitive data set(s) 824 stored in primitive buffer 430 as a primitive command set 820, thereby increasing the efficiency of execution of the sequence of graphics primitive data set(s) 824. The graphics primitive data sets 824 in primitive buffer 430 may be executed in this optimized manner because there are no non-vertex related graphics calls 407 in a primitive command set 820. As a result, overhead typically associated with performing steps (1)–(3) is avoided.

Figure 9:
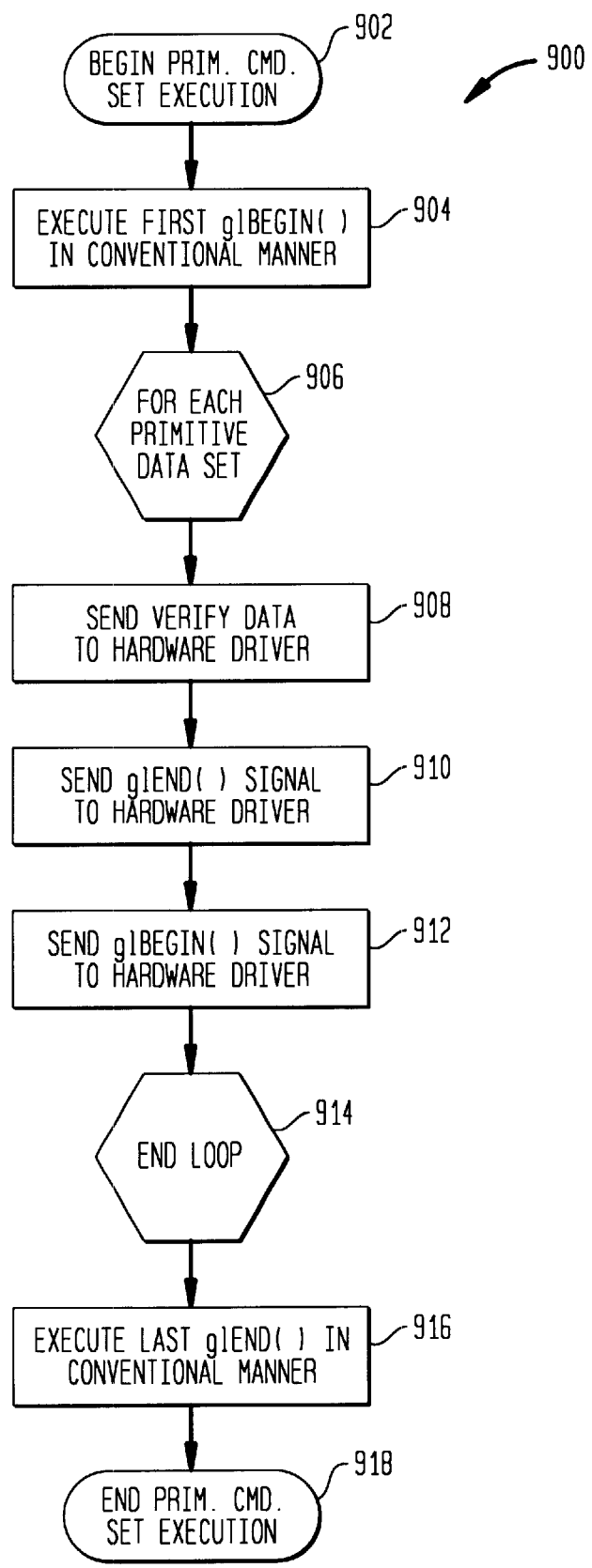
FIG. 9 is a flow chart of an exemplary method for executing a primitive command set according to one embodiment of the performance optimization system of the present invention.

Referring to FIG. 9, display list executor 412 executes a primitive command set 820 as follows. First, a conventional glBegin( ) command is executed (step 904). Next, for each graphics primitive data set 824 stored in primitive buffer 430 (steps 906, 914), vertex data for the graphics primitive data set 824 are sent to the hardware graphics driver 308 (step 908). Next, a signal 409 is sent to graphics driver 308 corresponding to a glEnd( ) call (step 910). Similarly, display list executor 412 sends a signal 409 to graphics driver 308 corresponding to a glBegin( ) call (step 912), without incurring any of the overhead normally associated with a glBegin( ) call executed by software driver 306. That is, when display list executor 412 executes the first glBegin( ) graphics call of a primitive command set 820, executor 412 performs all operations typically associated with the execution of a glBegin( )—steps (1)–(4) described above. This process continues for the remaining primitive data set(s), if any, in optimized primitive command set 820. After the last graphics primitive data set 824 is executed, display list executor 412 executes a conventional glEnd( ) command (step 916).

As noted, FIG. 4C illustrates a third aspect of the present invention wherein optimizer 402C includes both, a primitive data set coalescer 450 and a primitive command set generator 460. In accordance with this aspect of the invention, coalescer 450 performs functions and operations similar to those described above with respect to primitive DAT set coalescer 404. Similarly, primitive command set generator 460 performs function similar to those described above with reference to primitive command set generator 424.

However, in the illustrative embodiment of this aspect of the invention, vertex buffer 454 performs the functions described above with respect to vertex buffer 422 as well as graphics call buffer 426. That is, once vertex buffer 454 has stored therein a complete primitive data set, primitive accumulator 456 may perform the operations described above. Other modifications may also be made to the two prior aspects when combined into the third that are considered to be within the scope of the present invention. For example, should vertex accumulator 452 determine that a particular primitive data set cannot be combined with other primitive data sets; that is, it is not an independent primitive type as described above with reference to the exemplary embodiment in FIG. 4A, then vertex accumulator 452 may add the primitive data set to vertex buffer 454 and flush the buffer to primitive accumulator 456. Similarly, under those circumstances that vertex buffer 422 was flushed, in the instant aspect of the invention, such data may be forwarded to primitive accumulator 456 when the contents of vertex buffer 454 include a complete primitive data set; otherwise the contents of vertex buffer 454 is flushed to display list memory 410 and the accumulator and command set generation operations are applied to a new original graphics call sequence 401.

It should be understood that the present invention is not limited to use with any particular computer platform, processor, or programming language. Aspects of the present invention may be implemented in software, hardware, firmware, or a combination of the three. The various elements of the system, either individually or in combination, may be implemented as a computer program product tangibly embodied in a machine-readable storage device for execution by a computer processor. Various steps of embodiments of the invention may be performed by a computer processor executing a program (i.e., software or firmware)

tangibly embodied on a computer-readable medium to perform functions by operating on input and generating output. The computer-readable medium may, for example be a memory in a computer or a transportable medium such as a compact disk, a floppy disk, or a diskette, such that a computer program embodying the aspects of the present invention can be loaded onto any computer. The computer program is not limited to any particular embodiment, and may, for example, be an application program, foreground or background process, driver, or any combination thereof, executing on a single computer processor or multiple computer processors. Computer programming languages suitable for implementing such a system include procedural programming languages, object-oriented programming languages, and combinations of the two.

While various embodiments of the present invention have been described above, it should be understood that they have been presented by way of example only, and not limitation. For example, it should be appreciated that the present invention may be implemented in other ways, and that the embodiments described herein are not limiting. For example, the optimization system of the present invention need not be implemented in display list driver 312. Alternatively, the optimization system and methodology may be implemented, for example, in software or hardware associated with driver 308, graphics hardware 304, graphics application 302 or in other operational positions within a graphics pipeline. Furthermore, the optimization system of the present invention may, for example, be implemented as a separate application program or as a separate component in host 108 or in graphics system 100 which intercepts graphics calls generated by graphics application 302. Thus, the breadth and scope of the present invention should not be limited by any of the above-described exemplary embodiments, but should be defined only in accordance with the following claims and their equivalents.

What is claimed is:

1. A graphics call sequence optimizer for optimizing an original graphics call sequence generated by a graphics application in a graphics system that includes a display list memory, the optimizer comprising:
   a primitive command set generator configured to generate from the original graphics call sequence a primitive command set for storage in the display list, comprising a plurality of primitive data sets to be executed in immediate succession with no intervening non-vertex-related graphics calls, wherein each primitive data set specifies a graphics primitive and comprises a plurality of vertex-related graphics calls
   wherein the primitives specified by the primitive data sets in the primitive command set are either different types of primitives or are all the same type of primitive.

2. The optimizer of claim 1, further comprising:
   a display list executor, responsive to the primitive command set generator, configured to execute the primitive command set stored in the display list memory such that operations required for all of the primitive data sets are performed once for all of the primitive data sets included in the primitive command set.

3. The optimizer of claim 2, wherein the generator communicates with the executor through a command word included in the primitive set command in the display list.

4. The optimizer of claim 1, wherein the graphics calls generated by the graphics application program are compliant with OpenGL graphics application program interface (API), and each of the one or more primitive data sets comprises a glBegin( ) graphics call, a glEnd( ) graphics call and at least one intermediate vertex-related graphics call.

5. The optimizer of claim 1, wherein the primitive data sets each consist of:
   a first graphics call specifying the beginning of the primitive data set and identifying the primitive to be rendered by the primitive data set;
   a last graphics call specifying the end of the primitive data set; and
   at least one vertex-related graphics call specifying at least one vertex interposed between the first and last graphics calls.

6. The optimizer of claim 5, wherein the vertex-related graphics calls comprise one or more of the group consisting of:
   one or more graphics vertex calls each specifying a vertex of the identified primitive; and
   one or more graphics state calls each specifying a value of a state variable that affects the rendering of the graphics primitive on an output device.

7. The optimizer of claim 1, wherein the graphics calls generated by the graphics application program are compliant with OpenGL graphics application program interface (API) and the non-vertex-related graphics comprise:
   one or more graphics calls that alter the modal state of the graphics system.

8. The optimizer of claim 1, wherein the primitive command set generator stores the primitive command set in a single contiguous region of the display list memory.

9. The optimizer of claim 1, wherein the a primitive data sets accumulated by the primitive command set generator are complete primitive data sets.

10. The optimizer of claim 7, wherein the graphics calls generated by the graphics application program are complaint with an OpenGL graphics application program interface (API), and wherein the one or more graphics state calls comprise one or more of the group consisting of:
    a glMatrix( ) graphics state call;
    a glLine Width( ) graphics state call; and
    a glNormal( ) graphics state call.

11. A method for optimizing a sequence of original graphics calls generated by a graphics application program the method comprising:
    a) receiving the sequence of original graphics calls as they are generated by the graphics application;
    b) selecting a plurality of primitive data sets that occur sequentially in the original graphics call sequence without intervening non-vertex-related graphics calls; and
    c) generating a primitive command set that includes the sequential primitive data sets and a primitive set command identifying the sequential primitive data sets as elements of a primitive command set, wherein the primitives specified by Me primitive data sets in the primitive command set are either different types of primitives or are all the same type of primitive.

12. The method of claim 11, wherein selecting a plurality of primitive data sets comprises:
    1) determining whether a received graphics call is a non-vertex-related graphics call or a vertex-related graphics call;
    2) if the received graphics call is a vertex-related graphics call, accumulating the received graphics call with any immediately-successive vertex-related graphics calls that occurred prior to the received graphics call; and
    3) if the received graphics call is a non-vertex-related graphics call, writing any accumulated graphics calls and the received non-vertex-related graphics call to a display list memory.

13. The method of claim 11, wherein generating a primitive command set comprises:
   1) determining whether the accumulated vertex-related graphics calls form a complete primitive data set;
   2) if an incomplete primitive data set has been received, writing the accumulated graphics calls to a display list memory;
   3) if a complete primitive data set has been received, writing the accumulated graphics calls to a temporary buffer;
   4) transferring one or more complete primitive data sets from the temporary buffer to the display list memory; and
   5) writing to the display list memory a primitive set command identifying the sequential primitive data sets as a primitive command set.

14. The method of claim 13, wherein the graphics calls are compliant with an OpenGL API, and wherein each of the graphics primitive data sets in the primitive command set comprise:
   a glBegin( ) graphics call;
   a glEnd( ) graphics call; and
   at least one vertex-related graphics call occurring subsequent to the glBegin( ) graphics call and prior to the glEnd( ) graphics call.

15. In a graphics system including a display list memory to store graphics calls to be executed, a graphics call sequence optimizer for optimizing an original graphics call sequence generated by a graphics application program, the optimizer generating an optimized graphics call sequence comprising a primitive command set for storage in contiguous display list memory locations, the primitive command set including primitive data sets occurring in immediate succession with no intervening non-vertex-related graphics calls, each primitive data set comprising one or more sequentially-occurring original vertex-related graphics calls, and wherein the primitives specified by the primitive data sets in the primitive command set are either different types of primitives or are all the same type of primitive.

16. The graphics call sequence optimizer of claim 15, wherein the optimizer comprises:
   a graphics call dispatcher that distinguishes vertex-related graphics calls from non-vertex-related graphics calls;
   a primitive command set generator configured to receive the vertex-related graphics calls from the dispatcher and to generate the primitive command set for storage in the display list memory; and
   a display list executor configured to retrieve the primitive command set from the display list memory and to execute the primitive command set without performing duplicative operations associated with each primitive data set included in the primitive command set.

17. The graphics call sequence optimizer of claim 16, wherein the primitive command set further includes a first entry in the display list memory, an instruction notifying the executor of at least that the primitive data sets stored in the next sequential memory locations comprise a primitive command set.

18. The graphics call sequence optimizer of claim 15,
   wherein the graphics calls are compliant with OpenGL API, each of the primitive data sets in the optimized graphics call sequence comprising a glBegin( ) graphics call, a glEnd( ) graphics call and intermediate vertex-related graphics calls,
   wherein the display list executor performs operations applicable to all primitive data sets only when it executes a first occurring glBegin( ) graphics call.

19. In a graphics system including a display list memory to store graphics calls to be executed, a method for optimizing an original graphics call sequence generated by a graphics application program in accordance with a graphics application program interface (API) to generate an optimized graphics call sequence; the original graphics call sequence including a plurality of graphics primitive data sets, the method comprising the steps of:
   a) accumulating vertex-related commands in the original graphics call sequence in a first buffer;
   b) identifying the graphics primitive data sets occurring sequentially in the original graphics call sequence accumulated in the first buffer;
   c) forming a primitive command set in a second buffer, the primitive command set including the identified graphics primitive data sets occurring sequentially in the original graphics call sequence and a primitive set command identifying the identified graphics primitive data sets as belonging to a primitive command set; and
   d) storing the primitive command set in the display list memory,
      wherein the primitive command set is included in an optimized graphics call sequence that effects a same rendering in the graphics system as the original graphics call sequence, and wherein the primitives specified by the primitive data sets in the primitive command set are either different types of primitives or are all the same type of primitive.

* * * * *